United States Patent
Stolz

(10) Patent No.: US 11,585,069 B2
(45) Date of Patent: Feb. 21, 2023

(54) PIN AND RETAINER LOCKING SYSTEM

(71) Applicant: Caterpillar Inc., Deerfield, IL (US)

(72) Inventor: Michael R. Stolz, Franklin, WI (US)

(73) Assignee: Caterpillar Inc., Peoria, IL (US)

( * ) Notice: Subject to any disclaimer, the term of this patent is extended or adjusted under 35 U.S.C. 154(b) by 1081 days.

(21) Appl. No.: 16/001,207

(22) Filed: Jun. 6, 2018

(65) Prior Publication Data
US 2019/0376254 A1    Dec. 12, 2019

(51) Int. Cl.
*F16G 15/06* (2006.01)
*E02F 3/58* (2006.01)
(Continued)

(52) U.S. Cl.
CPC ............. *E02F 3/58* (2013.01); *E02F 3/48* (2013.01); *F16C 11/10* (2013.01)

(58) Field of Classification Search
CPC ..... E02F 3/58; E02F 3/48; E02F 9/006; E02F 9/2841; E02F 3/3627; E02F 3/3663; E02F 3/3622; E02F 9/2833; E02F 3/3604; E02F 3/3618; E02F 3/3672; E02F 3/364; E02F 3/365; E02F 9/2825; E02F 3/3645; E02F 3/60; E02F 3/3631; E02F 3/3659; E02F 3/3668; E02F 3/3695; E02F 9/2816; E02F 9/2891; E02F 3/627; E02F 3/382; E02F 3/388; E02F 3/653; F16C 11/10; F16C 11/045; F16C 2350/26; F16C 11/0609; F16C 11/0623; F16C 11/0661; F16C 29/02; F16C 11/0604; F16C 11/0614; F16C 11/0642; F16C 11/0695; F16C 1/262; F16C 2226/62; F16C 2226/72; F16C 9/04; F16G 15/06; F16G 15/00; F16G 15/04; F16G 11/08; F16G 11/00; F16G 11/14; E21B 17/046; E21B 17/043; E21B 17/06; E21B 17/023; E21B 17/04; E21B 17/02;
(Continued)

(56) References Cited

U.S. PATENT DOCUMENTS 2,339,591 A * 1/1944 Weber ..................... F16B 5/10
411/554
2,369,344 A * 2/1945 Ehmann ................. F16G 15/06
29/525
(Continued)

FOREIGN PATENT DOCUMENTS

| CN | 104105830 B | 1/2018 |
|----|-------------|--------|
| CN | 107750310 B | 4/2020 |
| EP | 3159451 B1  | 8/2021 |

*Primary Examiner* — Edwin J Toledo-Duran
(74) *Attorney, Agent, or Firm* — von Briesen & Roper, s.c.

(57) ABSTRACT

A pinned connection assembly includes a first rigging component, a second rigging component, a rigging pin, a locking pin, and a lock. The first rigging component has an end with at least one coupling aperture and at least one retention aperture that is transverse to the coupling aperture. The second rigging component has an end with at least one coupling aperture. The rigging pin has an end with a retention groove. The rigging pin is inserted through the coupling apertures of the first and second rigging components. The locking pin has an end with a locking groove. The locking pin is inserted through the retention aperture and the retention groove. The locking groove has guide, transitional, and locking portions for engaging a key of the lock.

19 Claims, 21 Drawing Sheets

(51) Int. Cl.
  *F16C 11/10* (2006.01)
  *E02F 3/48* (2006.01)
(58) Field of Classification Search
  CPC .......... E21B 19/02; E21B 19/04; E21B 19/10;
    E21B 34/102; F16B 2200/10; F16B
    21/12; F16B 3/00; F16B 21/16; F16B
    2200/20; F16B 21/09; F16B 19/02; F16B
    5/0088; F16B 7/0433; F16B 2200/40
  USPC ...... 59/93, 86, 85, 78; 294/82, 83, 74, 78 R,
    294/76, 78 A; 24/116, 241 SL; 403/151,
    403/154, 155, 316–319, 327, 349.2,
    403/359.5, 359.2
  See application file for complete search history.

(56) References Cited

U.S. PATENT DOCUMENTS

| | | | | |
|---|---|---|---|---|
| 2,527,408 A * | 10/1950 | Dzus | ................... | F16B 5/10 |
| | | | | 411/555 |
| 2,580,666 A * | 1/1952 | Dzus | ................... | F16B 5/10 |
| | | | | 411/555 |
| 3,510,922 A * | 5/1970 | Dzus | ................... | F16B 5/10 |
| | | | | 411/347 |
| 3,584,350 A * | 6/1971 | Schenk | ................... | F16B 21/04 |
| | | | | 411/555 |
| 3,600,018 A * | 8/1971 | Dzus | ................... | E05B 83/24 |
| | | | | 292/62 |
| 3,656,466 A * | 4/1972 | Dzus, Jr. | ................... | F16B 21/04 |
| | | | | 411/555 |
| 3,898,716 A * | 8/1975 | Aylott | ................... | F16B 21/04 |
| | | | | 24/DIG. 59 |
| 3,974,641 A * | 8/1976 | Rieger | ................... | F16G 15/00 |
| | | | | 59/93 |
| 4,067,090 A * | 1/1978 | Schenk | ................... | F16B 21/04 |
| | | | | 411/554 |
| 4,102,124 A | 7/1978 | Swager | | |
| 4,134,255 A * | 1/1979 | McBain | ................... | F16G 13/00 |
| | | | | 59/84 |
| 4,145,874 A * | 3/1979 | Muller | ................... | F16G 15/06 |
| | | | | 59/93 |
| 4,171,841 A * | 10/1979 | Rehbein | ................... | B66C 1/125 |
| | | | | 294/82.11 |
| 4,275,556 A * | 6/1981 | Stone | ................... | F16G 15/00 |
| | | | | 294/82.11 |
| 4,296,290 A * | 10/1981 | Peot | ................... | H01H 13/62 |
| | | | | 200/522 |
| 4,337,614 A | 7/1982 | Briscoe | | |
| 4,516,872 A * | 5/1985 | Eiermann | ................... | G01K 7/16 |
| | | | | 374/E7.018 |
| 4,935,996 A * | 6/1990 | Ferrara | ................... | A44B 11/2596 |
| | | | | 24/587.11 |
| 5,046,881 A * | 9/1991 | Swager | ................... | F16G 15/06 |
| | | | | 403/324 |
| 5,240,361 A * | 8/1993 | Armstrong | ................... | F16B 19/109 |
| | | | | 269/48.2 |
| 5,297,858 A * | 3/1994 | Zupan | ................... | B60F 1/046 |
| | | | | 303/22.7 |
| 5,620,291 A * | 4/1997 | Hayes | ................... | F16B 21/02 |
| | | | | 411/549 |
| 5,865,557 A | 2/1999 | Kasim | | |
| 5,966,849 A | 10/1999 | Moehnke et al. | | |
| 5,996,728 A | 12/1999 | Stark | | |
| 6,543,260 B2 * | 4/2003 | Koy | ................... | E05B 67/365 |
| | | | | 280/507 |
| 6,773,215 B2 * | 8/2004 | Cuva | ................... | F16B 21/02 |
| | | | | 411/553 |
| 8,104,988 B2 * | 1/2012 | Lunn | ................... | F16G 15/06 |
| | | | | 403/317 |
| 8,591,160 B2 * | 11/2013 | Shinozaki | ................... | F16B 5/0628 |
| | | | | 411/21 |
| 8,939,691 B2 * | 1/2015 | Tseng | ................... | F16B 21/04 |
| | | | | 411/347 |
| 9,841,044 B2 * | 12/2017 | Wang | ................... | F16B 21/04 |
| 10,434,830 B2 * | 10/2019 | Baker | ................... | B60D 1/18 |
| 2002/0078721 A1 * | 6/2002 | Vellette | ................... | F16K 35/10 |
| | | | | 70/177 |
| 2003/0231946 A1 * | 12/2003 | Heiple | ................... | E02F 3/3627 |
| | | | | 414/723 |
| 2006/0099838 A1 * | 5/2006 | Meyers | ................... | E02F 9/006 |
| | | | | 439/134 |
| 2008/0012315 A1 * | 1/2008 | Rose | ................... | F16L 37/086 |
| | | | | 285/317 |
| 2010/0132178 A1 * | 6/2010 | Chiu | ................... | F16B 5/0208 |
| | | | | 29/281.5 |
| 2010/0137116 A1 * | 6/2010 | Chiu | ................... | F16B 5/0208 |
| | | | | 29/281.5 |
| 2010/0215424 A1 * | 8/2010 | Crookston | ................... | E05B 47/0009 |
| | | | | 310/306 |
| 2010/0232908 A1 * | 9/2010 | Chiu | ................... | F16B 5/0208 |
| | | | | 411/554 |
| 2010/0290861 A1 * | 11/2010 | Wang | ................... | F16B 5/0208 |
| | | | | 411/107 |
| 2012/0040035 A1 * | 2/2012 | Chiu | ................... | F16B 5/0208 |
| | | | | 425/110 |
| 2012/0195711 A1 * | 8/2012 | Chiu | ................... | F16B 5/0266 |
| | | | | 411/103 |
| 2012/0224935 A1 * | 9/2012 | Chiu | ................... | F16B 5/0208 |
| | | | | 411/352 |
| 2012/0291318 A1 | 11/2012 | Attwood | | |
| 2012/0301244 A1 * | 11/2012 | Chiu | ................... | F16B 21/02 |
| | | | | 411/166 |
| 2013/0008212 A1 * | 1/2013 | Kantajaraniti | ................... | B60R 25/005 |
| | | | | 70/198 |
| 2013/0047410 A1 * | 2/2013 | Campbell | ................... | F16G 15/06 |
| | | | | 29/525.01 |
| 2013/0170895 A1 * | 7/2013 | Tseng | ................... | F16B 35/06 |
| | | | | 403/270 |
| 2014/0186105 A1 | 7/2014 | Martinelli et al. | | |
| 2020/0408238 A1 * | 12/2020 | McKeirnan, Jr. | ...... | F16B 39/108 |

\* cited by examiner

PIN AND RETAINER LOCKING SYSTEM

TECHNICAL FIELD

The present application relates generally to dragline buckets and dragline bucket rigging equipment and more particularly to pin and retainer locking systems for coupling components of the dragline bucket equipment together.

BACKGROUND OF THE INVENTION

Dragline bucket rigging equipment can be used for mining applications and general earth moving operations. Dragline bucket rigging equipment generally includes a dragline bucket that engages the ground and excavates soil from the ground. Components of the dragline bucket rigging equipment can be connected by a pin and retainer system.

U.S. Pat. No. 8,469,622 to McClanahan et al. discloses an improved connection system for pinned connections. The connection system may be utilized in dragline excavating systems and a variety of other types of mining, dredging, forestry, and construction equipment. An insert used in the connection systems has a frustoconical shape that joins with an aperture in an element being joined by the connection system.

The present disclosure is directed toward overcoming one or more of the problems discovered by the inventors or that is known in the art.

SUMMARY

An exemplary pinned connection assembly includes a first rigging component, a second rigging component or bucket, a rigging pin, a locking pin, and a lock. The first rigging component has an end with at least one coupling aperture and at least one retention aperture that is transverse to the coupling aperture. The second rigging component has an end with at least one coupling aperture. The rigging pin has an end with a retention groove. The rigging pin is inserted through the coupling apertures of the first and second rigging components. The locking pin has an end with a locking groove. The locking pin is inserted through the retention aperture and the retention groove. The locking groove has guide, transitional, and locking portions for engaging a key of the lock.

Another exemplary pinned connection assembly includes a first rigging component, a second rigging component or bucket, a rigging pin, a and a lock. The first and second rigging components each have an end with at least one coupling aperture. The rigging pin has an end with a multi-directional locking groove. The rigging pin is inserted through the coupling apertures of the first and second rigging components. The locking groove has guide, transitional, and locking portions for engaging a key of the lock.

An exemplary method of assembling a pinned connection assembly includes steps of: (1) inserting a rigging pin through coupling apertures of first and second rigging components; (2) inserting a locking pin through a retention aperture of the first rigging component and a retention groove of the rigging pin; (3) placing a lock on the locking pin so that a key of the lock is received in a multi-directional locking groove of the locking pin; (4) compressing the lock against the locking pin to compress a spring member of the lock and move the key within the multi-directional locking groove; (5) rotating the lock to move the key within the multi-directional locking groove; and (6) releasing the lock to lock the key within the multi-directional locking groove.

A further understanding of the nature and advantages of the present invention are set forth in the following description and claims, particularly when considered in conjunction with the accompanying drawings in which like parts bear like reference numerals.

BRIEF DESCRIPTION OF THE DRAWINGS

To further clarify various aspects of embodiments of the present disclosure, a more particular description of the certain embodiments will be made by reference to various aspects of the appended drawings. It is appreciated that these drawings depict only typical embodiments of the present disclosure and are therefore not to be considered limiting of the scope of the disclosure. Moreover, while the figures can be drawn to scale for some embodiments, the figures are not necessarily drawn to scale for all embodiments. Embodiments and other features and advantages of the present disclosure will be described and explained with additional specificity and detail through the use of the accompanying drawings in which.

DETAILED DESCRIPTION

The following description refers to the accompanying drawings, which illustrate specific embodiments of the present disclosure. Other embodiments having different structures and operation do not depart from the scope of the present disclosure.

Exemplary embodiments of the present disclosure are directed to systems and methods for connecting components of a dragline bucket rigging system. The systems and methods disclosed herein include a pin and retainer assembly for dragline bucket rigging equipment. The pin and retainer assembly can include a rigging pin, a locking pin, and a lock and can couple and lock two rigging components together. The rigging pin can include a locking groove for receiving the locking pin, and the locking pin can include a plurality of multi-directional grooves for receiving mating features of the lock. The pin and retainer assembly may couple the two rigging components by a coupling process. In addition, the two rigging components may be decoupled by a reverse of the coupling process.

Figure 1:
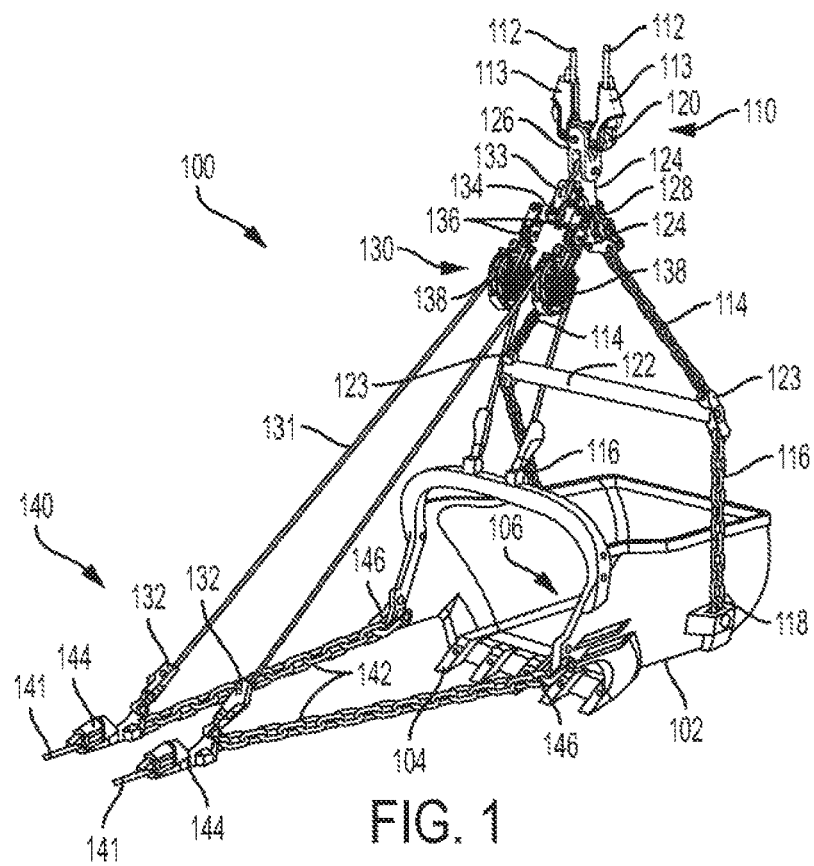
FIG. 1 shows a perspective view of a dragline bucket rigging system.

Referring now to FIG. 1, a perspective view of dragline bucket rigging equipment 100 is shown. Dragline bucket rigging equipment 100 includes a bucket 102, a hoist assembly 110, a dump assembly 130, and a drag assembly 140. The bucket 102 includes a plurality of excavating teeth 104 and an accumulation area 106.

The hoist assembly 110 includes components that are used to operate equipment such as, for example, a pair of hoist ropes 112, a pair of upper hoist chains 114, a pair of lower hoist chains 116, a pair of trunnion links 118, a hoist equalizer 120, a spreader bar 122, a pair of spreader bar ends 123, a pair of hoist sockets 113, a pick up link 124, a hoist link 126, and a hoist clevis 128. In some embodiment, a hoist assembly may include additional or fewer components.

The dump assembly 130 includes components that are used to operate equipment, such as, for example a pair of dump ropes 131, a pair of dump sockets 132, a dump link 133, a dump equalizer 134, a pair of block links 136, and a pair of dump blocks 138. In some embodiment, a dump assembly may include additional or fewer components.

The drag assembly 140 includes components that are used to operate equipment, such as, for example, a pair of drag ropes 141, a pair of drag chains 142, a pair of drag sockets 144, and a pair of drag devises 146. In some embodiment, a drag assembly may include additional or fewer components.

Figure 2:
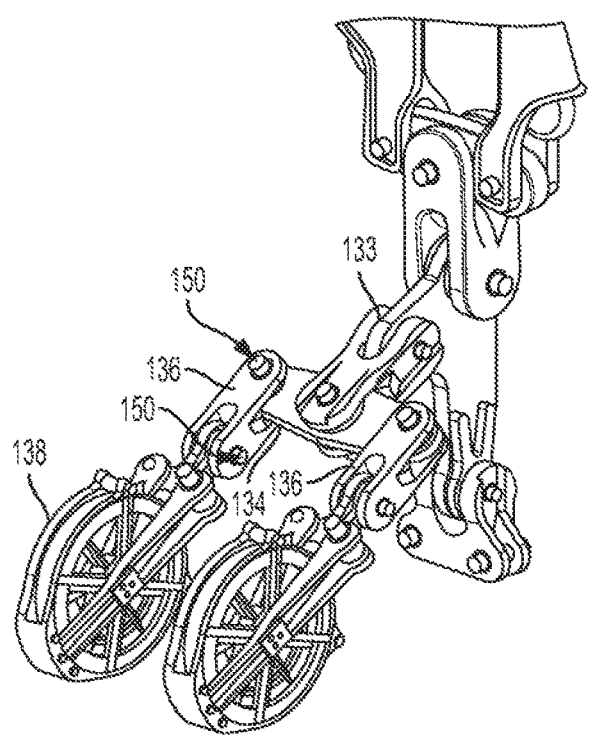
FIG. 2 shows an enlarged view of the dragline bucket rigging system of FIG. 1.

Referring now to FIG. 2, an enlarged view of the dragline bucket rigging equipment of FIG. 1 is shown. As can be seen in FIG. 2, various assemblies and elements of the dragline bucket rigging equipment 100 can be coupled together with pinned connections 150. Pinned connections 150 are capable of sustaining the heavy loads experienced by components of the dragline bucket rigging equipment 100 while also allowing for movement between the various components of the equipment 100. Pins used in the pinned connections 150 are retained within the pinned connections 150 with retention features, such as flanges.

Pinned connections 150 may be used between various components of the dragline bucket rigging equipment 100, for example, pinned connections 150 may couple the hoist equalizer 120 to the hoist socket 113 at one end of the hoist equalizer 120, another hoist socket 113 to the opposite end of the hoist equalizer 120, the hoist equalizer 120 to the hoist link 126 (also known as an opposite plane link), the hoist link 126 to the pick up link 124, the pick up link 124 to the dump link 133 (which may be an opposite plane link similar to the hoist link 126), the pick up link 124 to the hoist clevis 128, the dump link 133 to the dump equalizer 134 (which may be similar to the hoist equalizer 120), the dump equalizer 134 to the block link 136 (which may be an opposite plane link similar to the hoist link 126), another block link 136 to the dump equalizer 134, one of the block links 136 to the dump block 138, and/or the other block link 136 to the other dump block 138. The pinned connections 150 described above may vary in size, depending on the load and dimensional characteristics of each component in a particular pinned connection 150.

Components of the dragline bucket rigging equipment 100 may be swapped, rotated, reconfigured, or replaced entirely to distribute wear on the load bearing portions of the components. Prior art rigging pins (not shown), typically includes a pin body with square flanges at either end that are welded in place one the pin is inserted into position. The pinned connections 150 are disassembled to decouple the components of the dragline bucket rigging equipment 100. Welding to assemble prior art pinned connections and gouging out the welds to disassemble the connections adds significant labor cost to the coupling and decoupling of rigging components such as those used in the dragline bucket rigging equipment 100 shown in FIGS. 1 and 2.

Figure 3:
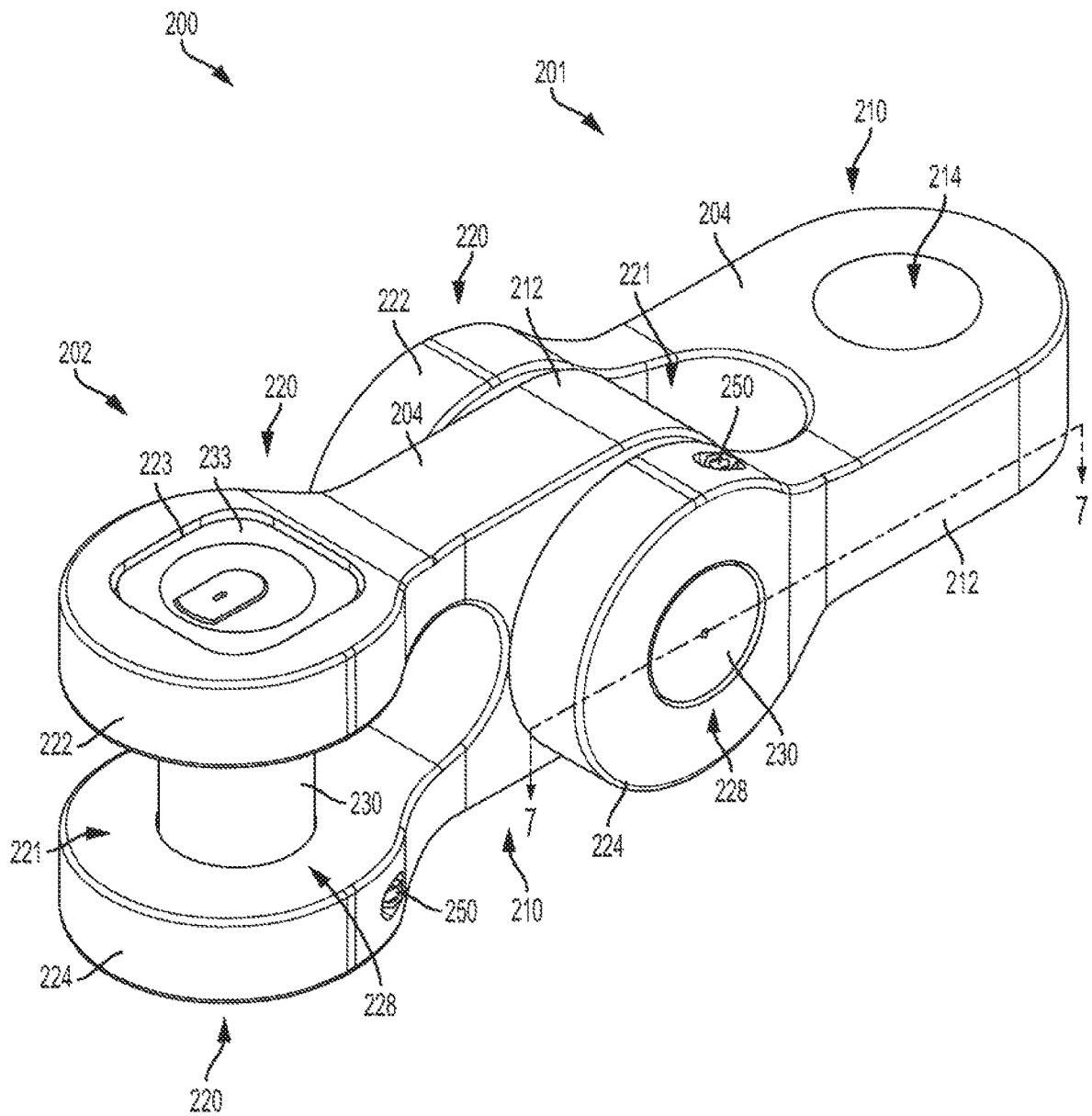
FIG. 3 shows a perspective view of an exemplary pinned connection coupling together two rigging components of a dragline bucket rigging system.
Figure 4:
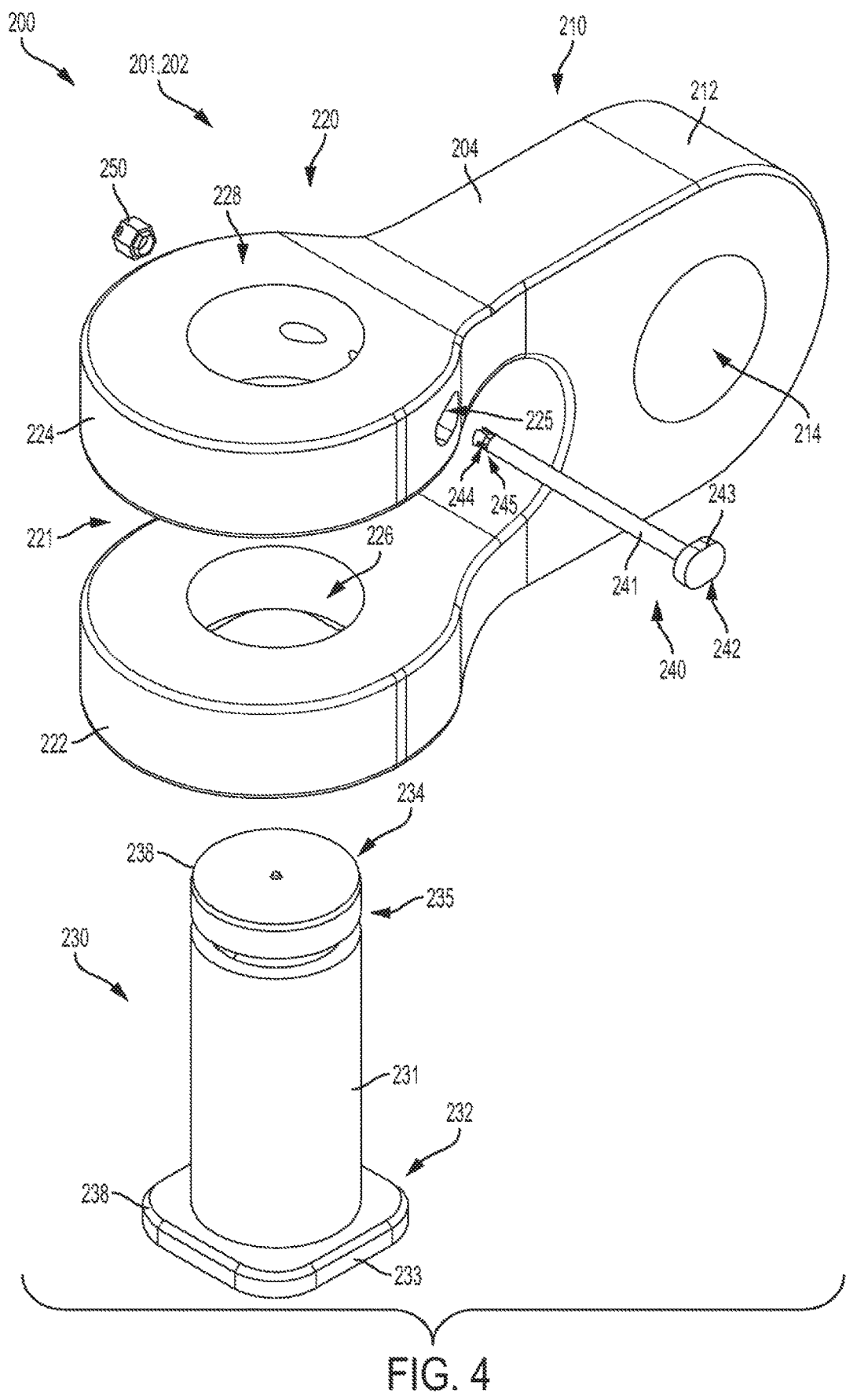
FIG. 4 shows an exploded view of the pinned connection of FIG. 3.

Referring now to FIGS. 3-18, an exemplary pinned connection 200 and components thereof are shown. Referring now to FIGS. 3-4, assembled and exploded views are shown of a pinned connection assembly 200 coupling together two example rigging components of dragline bucket rigging equipment. The rigging components shown in FIGS. 3-4 are similar to the opposite plane links described above (e.g., the hoist link 126), however, the rigging components can be any rigging components suitable for coupling by a pinned connection.

The two pinned coupling components shown in FIG. 3 are referred to as first and second rigging components 201, 202 and are coupled together with a rigging pin 230 retained in the first rigging component 201 by a locking pin 240 (FIG. 4). The locking pin 240 is secured in the rigging components 201 by a lock 250. The first and second rigging components 201, 202 of the pinned connection 200 are thus able to rotate relative to each other about the rigging pin 230, that is, a central axis of the rigging pin 230 is the rotational axis of the pinned connection 200.

Referring now to FIGS. 3-8, the rigging components 201, 202 have first and second ends 210, 220 that can be male or female ends. In the illustrated embodiment, the first ends 210 are male ends and the second ends 220 are female ends. In certain embodiments, both ends of one rigging component are female ends that couple to male ends of other rigging components. In certain other embodiments, both ends of one rigging component are male ends that couple to female ends of other rigging components.

The first and second ends 210, 220 extend from an intermediate portion or body 204. In certain embodiments, the first end 210 extends in a direction opposite from the second end 220. In other embodiments, the first end 210 extends in a direction orthogonal to the second end 220, or any other angular relationship. The rigging components 201, 202 may also include other ends for linking together two or more additional components (e.g., the pick up link 124 described above).

The first (male) end 210 includes an end link 212. The end link 212 includes an end link or coupling aperture 214 for receiving the rigging pin 230 during assembly of the pinned connection 200. In certain embodiments, the end link aperture 214 includes a bushing (not shown) that can be removed and replaced after being worn down during use. The bushing prohibits the aperture 214 from experiencing mechanical wear resulting from movement between the components of the pinned connection 200.

The second (female) end 220 includes first and second arms 222, 224 that extend from the intermediate portion 204 to form a U-shaped bracket. The first and second arms 222, 224 are spaced apart to form an opening 221 for receiving the end link 212 of the first end 210. For example, as shown in FIG. 3, the first end 210 of the second rigging component 202 is received within the opening 221 of the first rigging component 201.

The first and second arms 222, 224 each include a coupling aperture for receiving the rigging pin 230. The first arm 222 includes a first arm coupling aperture 226 (FIG. 4) and the second arm 224 includes a second arm coupling aperture 228. During assembly of the pinned connection 200, the rigging components 201, 202 are arranged so that the aperture 214 of the first end 210 is aligned with the apertures 226, 228 of the second end 220. The rigging pin 230 is then inserted through the first arm aperture 226, the end link aperture 214, and the second arm aperture 228 to couple the rigging components 201, 202, thereby forming the pinned connection 200.

The first arm 222 includes a counterbore 223 that is larger than the aperture 226. The counterbore 223 is shaped to receive a flange 233 of the rigging pin 230. In certain embodiments, the flange 233 and counterbore 223 cooperate together to prevent rotation of the rigging pin 230 relative to the rigging component 201, 202. For example, in the embodiment shown in FIG. 3, the flange 233 and counterbore 223 both have a rounded square shape so that the flange 233 of the rigging pin 230 engages the counterbore 223 and is prohibited from rotating. Any other shape suitable for prohibiting rotation of the rigging pin may be used for the counterbore and flange. Alternatively, in certain embodiments, the first arm includes protrusions that restrict the rotational movement of the flange of the rigging pin.

The second arm 224 includes a locking aperture 225 for receiving the locking pin 240. The locking aperture 225 is transverse to the second arm aperture 228 and is located such that the locking pin 240 engages a retention groove 235 of the rigging pin 230 when the rigging pin 230 is inserted into the apertures 226, 228 of the arms 222, 224 of the rigging component 201, 202. The locking aperture 225 is positioned and sized with the integrity of the rigging component 201, 202 in mind. In certain embodiments, an additional locking aperture (not shown) may be provided on an opposite side of the aperture 228 so that an additional locking pin 240 can be inserted to further retain the rigging pin 230.

The rigging pin 230 includes a cylindrical body 231 extending away from a flange end 232 to a retention end 234. In certain embodiments, the rigging pin 230 has a diameter of about three inches to about twelve inches. However, the rigging pin 230 may be any size as desirable for its intended purpose. The flange end 232 includes the flange 233 that is received in the counter bore 223 of the first arm 222, as described above. In certain embodiments, the direction of the rigging pin 230 is reversed such that the flange 233 is received in a counterbore (not shown) formed in the second arm 224.

The retention end 234 includes the retention groove 235 for receiving the locking pin 240 to retain the rigging pin 230 within the apertures 226, 228 of the second end 220. The retention groove has a groove width 236 (FIG. 5) and a groove depth 237 (FIG. 5) that are sized to receive the locking pin 240. In certain embodiments, the retention groove 235 extends around the circumference of the cylindrical body 231 of the rigging pin 230.

The rigging pin 230 can optionally include a chamfer 238 at the leading edges of the retention end 234 and/or on the flange 233 to ease assembly of the rigging pin 230 with rigging components 201, 202. In certain embodiments, the rigging pin 330 includes one or more lifting systems like the lifting system 260 shown in FIGS. 19-25. The lifting system 260 enables the rigging pin 330 to be lifted with a crane, winch, or other lifting device.

The locking pin 240 includes a cylindrical body 241 extending away from a flange end 242 to a locking end 244. The flange end 242 includes the flange 243 that can be received in a first counterbore 227 (FIG. 6) of the locking aperture 225. In certain embodiments, the flange 243 has a shape corresponding to the shape of the counterbore 227, such as the oval shape shown in FIG. 4. The locking end 244 includes multi-directional locking grooves 245 for receiving the lock 250 to retain the locking pin 240 within the aperture 225. The locking grooves 245 and the lock 250 are discussed further, below.

Figure 5:
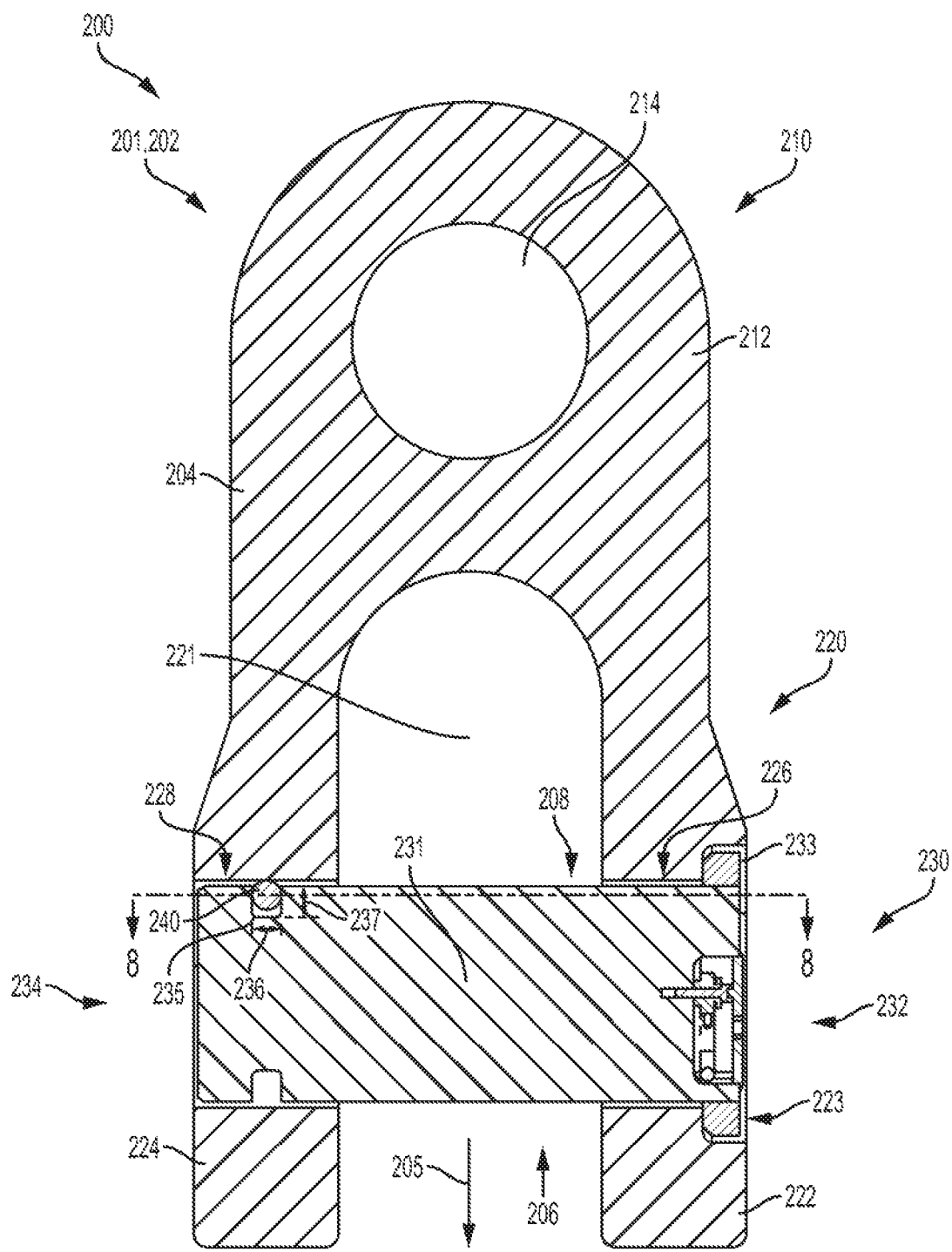
FIG. 5 shows a cross-section view of the pinned connection of FIG. 3 along the plane indicated by line 7-7 in FIG. 3.

Referring now to FIG. 5, a cross-sectional view of an assembled rigging component 201, 202, the rigging pin 230, and the locking pin 240 is shown. During operation of dragline bucket rigging equipment that includes pinned connections 200, a load 205 oriented away from the intermediate body 204 of the rigging component 201, 202 is applied on the rigging pin 230 by the end link 212 (not shown) of another rigging component (not shown).

When the load 205 is applied to the rigging pin 230, the pin 230 shifts towards the direction of the load 205 within the apertures 226, 228 of the first and second arms 222, 224. A loaded side 206 of the rigging pin 230—i.e., the side of the pin 230 facing the source of the load 205—is pulled against the sidewall of the apertures 226, 228. An unloaded side 208 of the rigging pin 230—i.e., the side of the pin 230 facing away from the source of the load 205—moves away from the sidewall of the apertures 226, 228, thereby increasing the space between the rigging pin 230 and the sidewall of the apertures 226, 228.

As can be seen in FIG. 5, the width 236 of the retention groove 235 is wider than the diameter of the locking pin 240 so that the locking pin 240 can be received in the groove 235. The depth 237 of the groove 235 can be greater than or less than the diameter of the locking pin 240. The diameter of the locking pin 240 is chosen so that at least half of the locking pin 240 remains within the retention groove 235 when the rigging pin 230 is shifted to the loaded side 206 by the load 205. That is, a gap formed between the rigging pin 230 and aperture 228 on the unloaded side 208 is less than half of the diameter of the locking pin 240 to prevent the pin 240 from skipping out of the groove 235 when the rigging pin 230 is subjected to the load 205.

Figure 6:
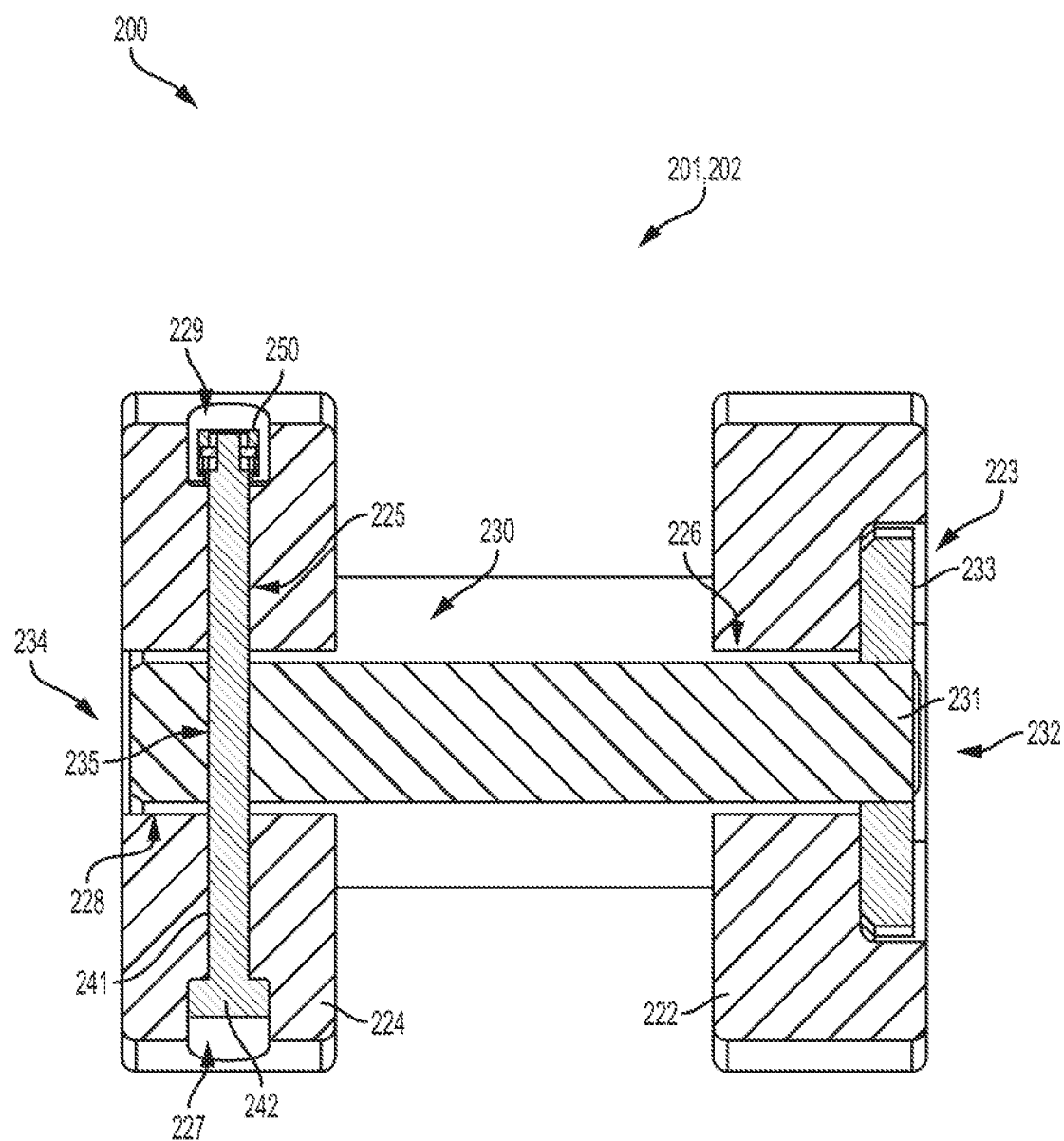
FIG. 6 shows a cross-section view of the pinned connection of FIG. 3 along the plane indicated by line 8-8 in FIG. 5.

Referring now to FIG. 6, a cross-sectional view of the pinned connection 200 of FIG. 5 is shown taken through the center of the locking pin 240. As can be seen in FIG. 6, the cylindrical body 241 of the locking pin 240 is received within the retention groove 235 of the rigging pin 230 to retain the rigging pin 230 within the apertures 226, 228. As noted above, the flange 243 of the locking pin 240 is received within the first counterbore 227. In certain embodiments, the flange 243 and the counterbore 227 cooperate together to prevent rotation of the locking pin 240 relative to the rigging component 201, 202. For example, in the embodiment shown in FIG. 4, the flange 243 and counterbore 227 (also seen in FIG. 7) both have an oval shape so that the flange 243 of the locking pin 240 engages the counterbore 227 and is prohibited from rotating. Any other shape suitable for prohibiting rotation of the rigging pin may be used for the counterbore and flange. Alternatively, in certain embodiments, the first arm includes protrusions that restrict the rotational movement of the flange of the rigging pin. The locking aperture 225 also includes a second counterbore 229 for receiving the lock 250 attached to the locking end 244 of the locking pin 240. The second counterbore 229 can be any shape suitable for receiving the lock 250 and any tools used to attach the lock 250 to the locking pin 240, such as, for example, a circular shape.

Figures 7, 8:
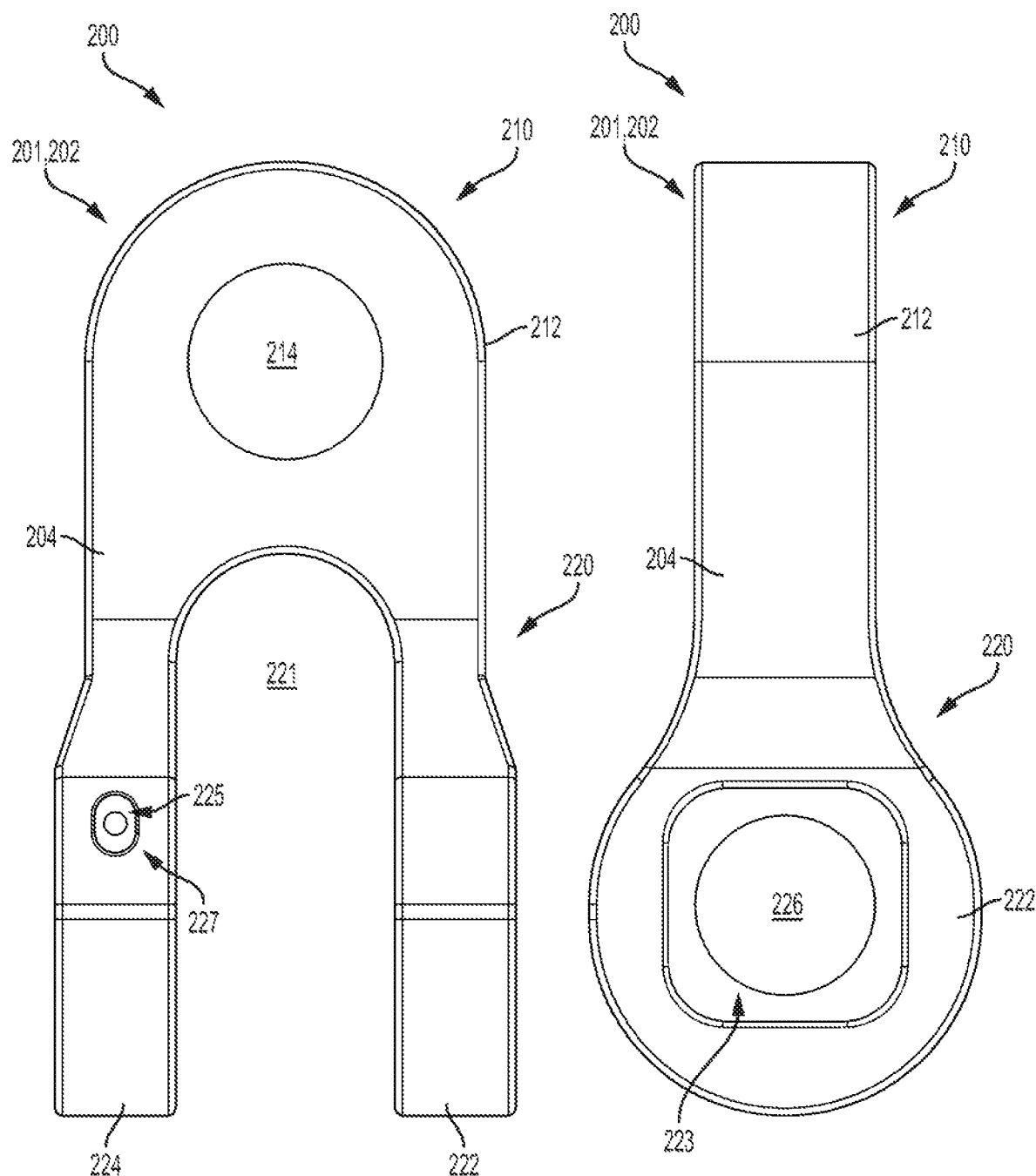
FIG. 7 shows a front view of an exemplary rigging component.
FIG. 8 shows a right side view of the exemplary rigging component of FIG. 7.

Referring now to FIGS. 7-8, front and right side views of the rigging component 201, 202 are shown. FIG. 7 clearly shows the U-shaped opening 221 defined by the first and the second arms 222, 224 of the second end 220 and the oval shaped counterbore 227 of the locking aperture 225. The rounded square shaped counterbore 223 in the first arm 222 is shown clearly in FIG. 8. The illustrated rigging component 201, 202 is symmetrical from side-to-side and front-to-back. However, the rigging component 201, 202 can take on any suitable shape for joining together various components of a dragline bucket rigging system.

Figure 9:
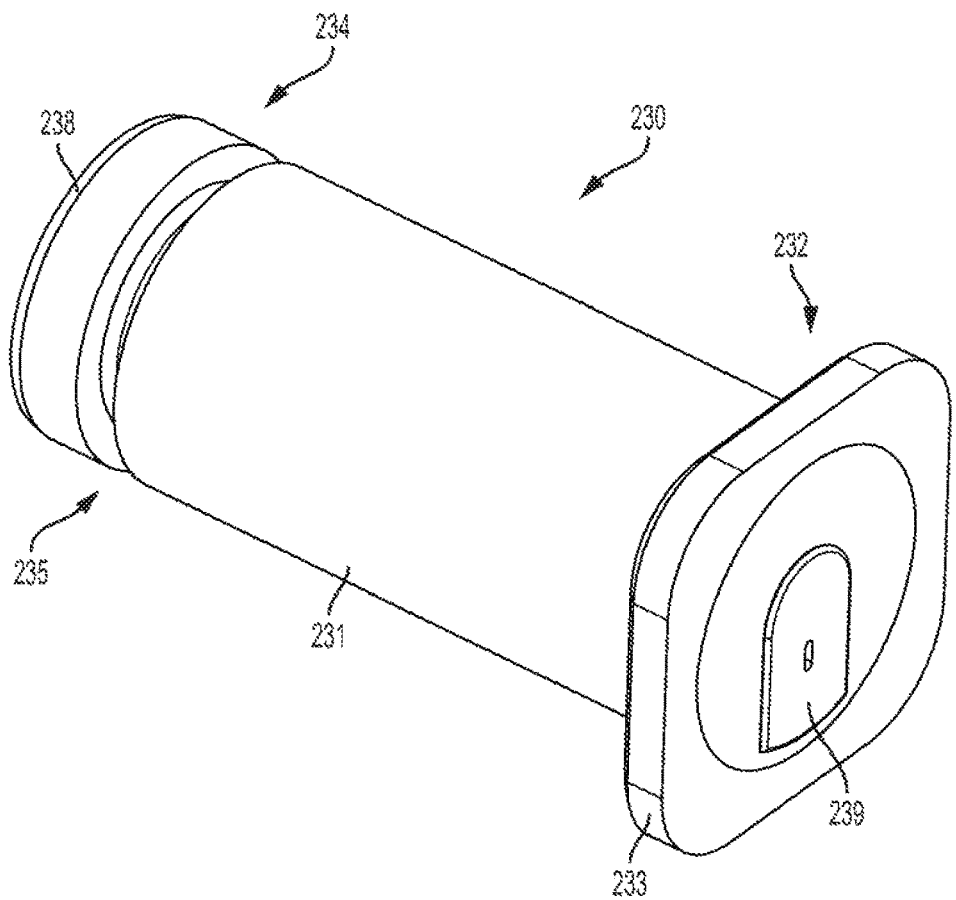
FIG. 9 shows a perspective view of an exemplary rigging pin.
Figure 10:
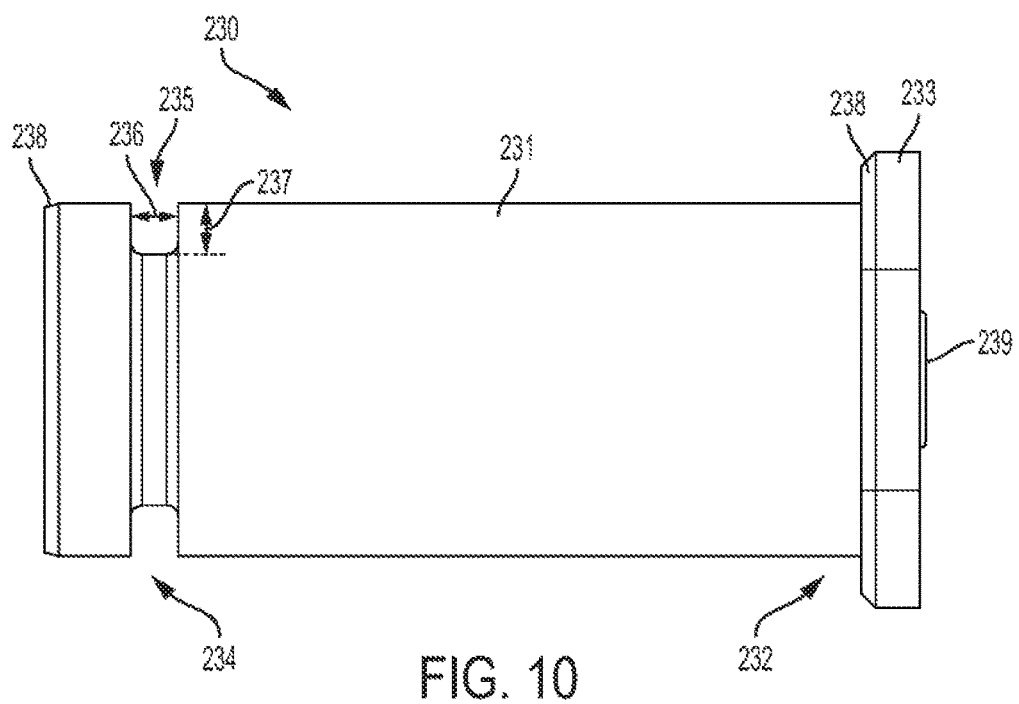
FIG. 10 shows a right side view of the rigging pin of FIG. 9.

Referring now to FIGS. 9-10, perspective and side views of one embodiment of the rigging pin 230 are shown. As was described above, the cylindrical body 231 of the rigging pin 230 extends away from the flange end 232 to the retention end 234. The flange end 232 includes the flange 233 that is received in the counter bore 223 of the first arm 222 and the retention groove 235 receives the locking pin 240 to retain the rigging pin 230 within the apertures 226, 228 of the second end 220. In certain embodiments, the retention groove 235 extends around the circumference of the cylindrical body 231 of the rigging pin 230. The rigging pin 230 can optionally include a chamfer 238 at the leading edges of the retention end 234 and/or on the flange 233 to ease assembly of the rigging pin 230 with rigging components 201, 202. The rigging pin 230 also can optionally include a cover 239A for a lifting system (FIGS. 19-25).

Figure 11:
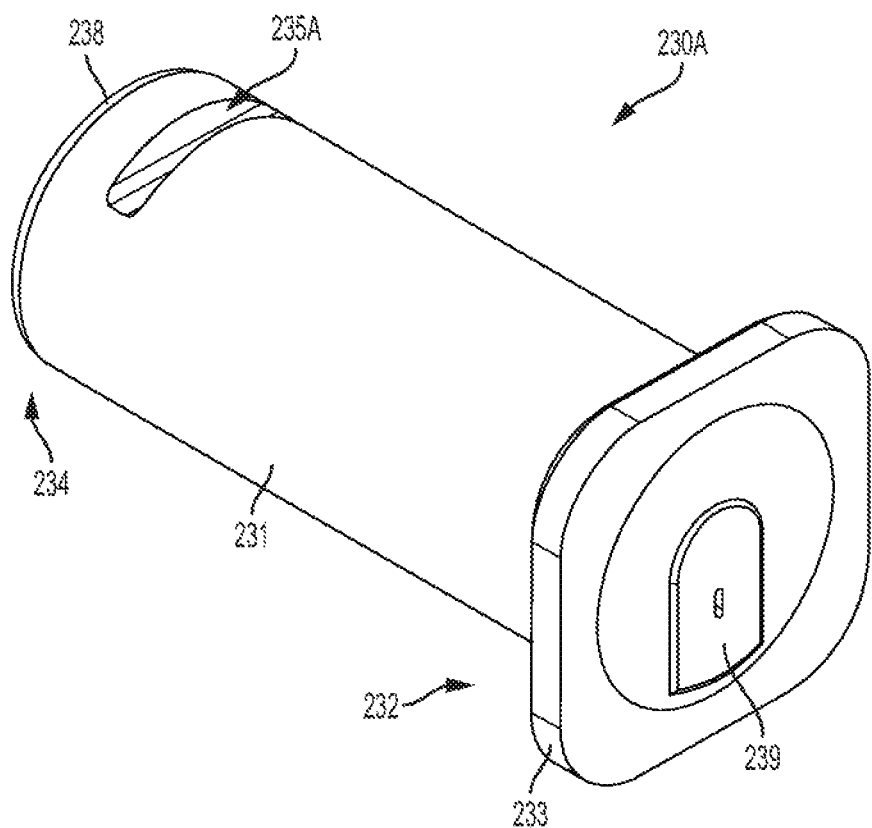
FIG. 11 shows a perspective view of another exemplary rigging pin.
Figure 12:
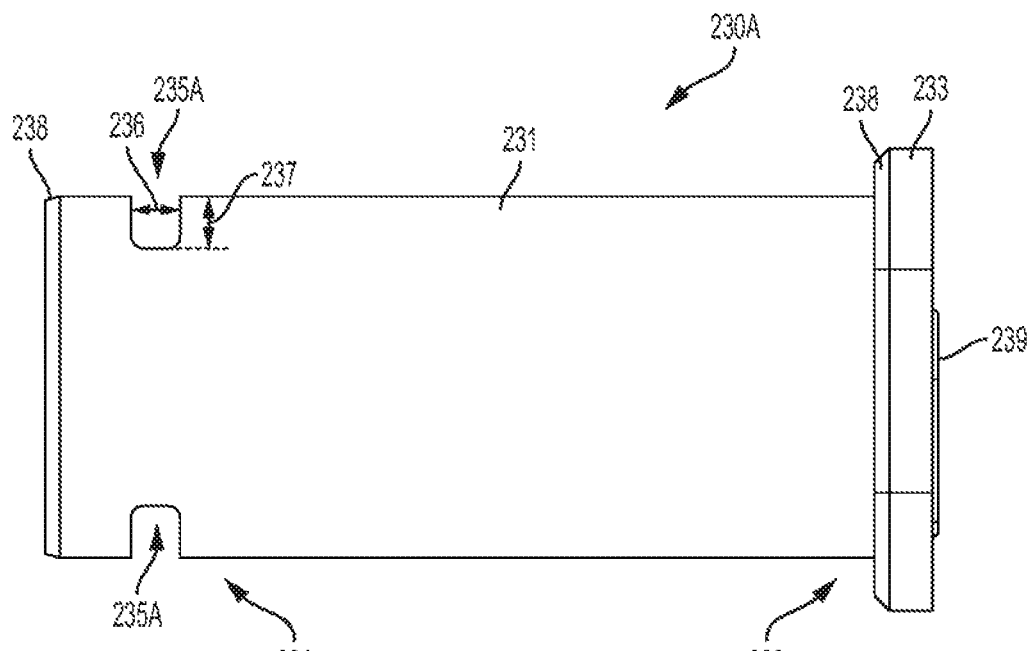
FIG. 12 shows a right side view of the rigging pin of FIG. 11.

Referring now to FIGS. 11-12, perspective and side views of another embodiment of a rigging pin 230A are shown. The rigging pin 230A shown in FIGS. 11-12 similar to the rigging pin 230 shown in FIGS. 9-10 except that the rigging pin 230A of FIGS. 11-12 includes two tangential retention grooves 235A rather than the single circumferential groove 235. In certain embodiments, the rigging pin 230A includes a single tangential retention groove 235A that can be oriented toward the loaded 206 or unloaded 208 side of the pin 230 during assembly. The tangential retention groove 235A has an additional benefit in that the tangential retention groove 235A engages the cylindrical body 241 of the locking pin 240 to prohibit rotation of the rigging pin 230A.

The circumferential and tangential retention grooves 235, 235A described above can be arranged in various configurations. For example, such retention grooves 235, 235A may be provided at both ends of the rigging pin 230 so that the rigging pin 230 does not have a flange end 232 but two retention ends 234 instead. In such an embodiment, additional locking pins 240 are provided to retain the rigging pin 230. Each retention end 234 of the pin 230 may be retained with one, two, or more locking pins 240. Thus, in certain embodiments, two locking pins 240 are employed to retain the rigging pin 230. In certain embodiments, four locking pins 240 are employed, two at each end, to retain the rigging pin 230. Consequently, the first and second arms 222, 224 may include a corresponding number of apertures 225 for receiving the locking pins 240.

Figure 13:
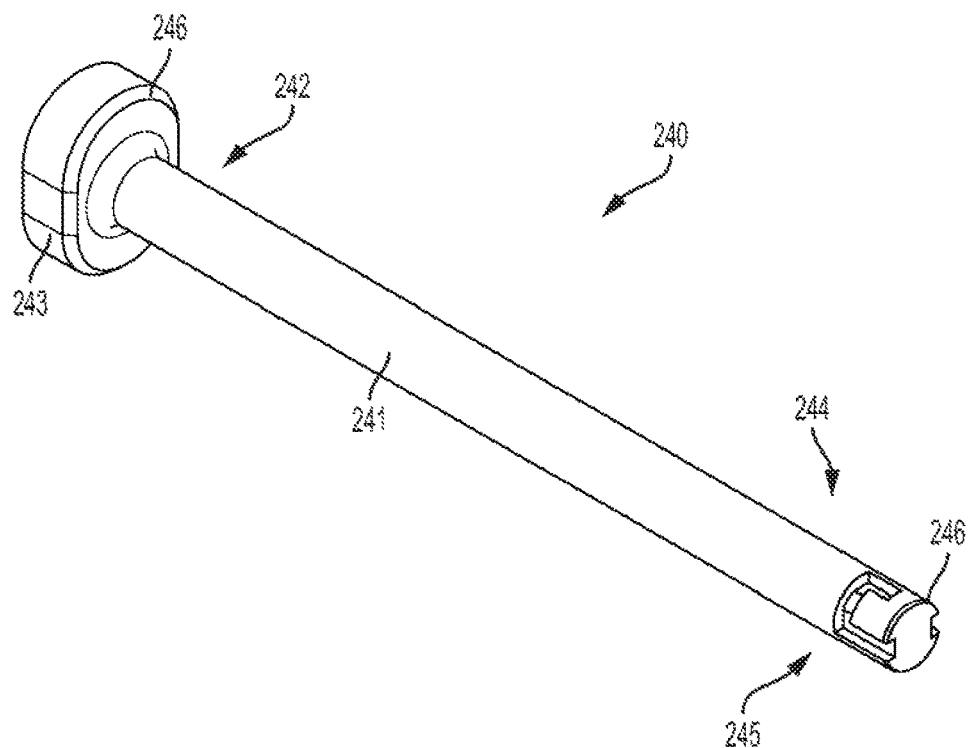
FIG. 13 shows a perspective view of an exemplary locking pin.
Figure 14:
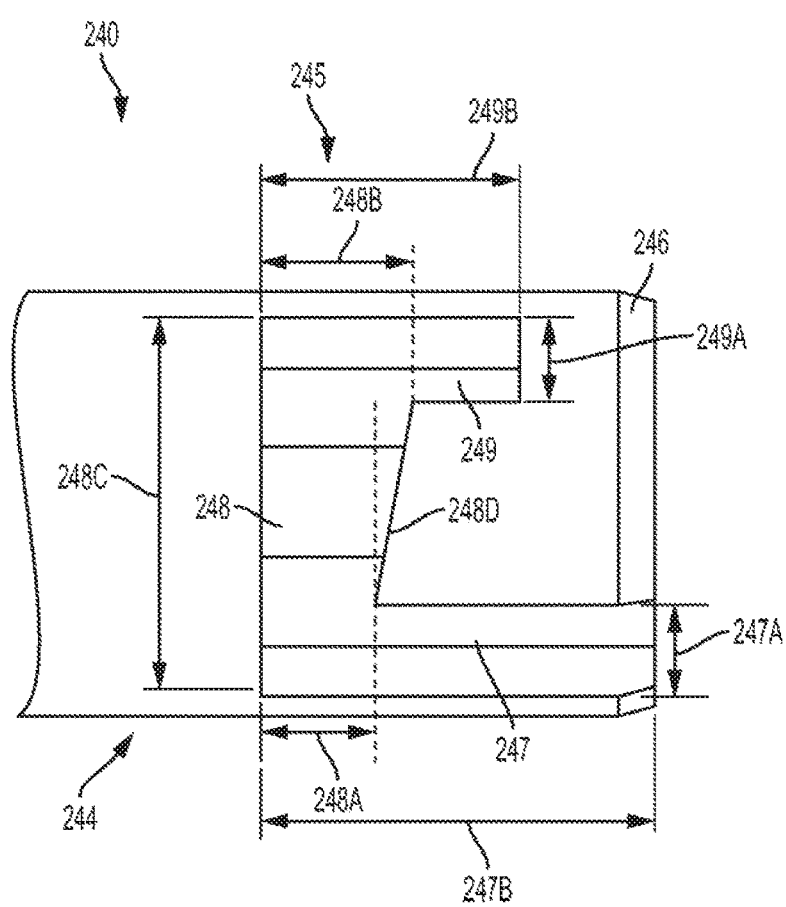
FIG. 14 shows an enlarged view of the locking pin of FIG. 13.

Referring now to FIGS. 13-14, a perspective view and an enlarged side view of the locking pin 240 are shown. As was described above, the cylindrical body 241 of the locking pin 240 extends from the flange end 242 to the locking end 244. The flange end 242 includes the flange 243 that is received in the counter bore 227 of the first arm 222. The locking end 244 includes two multi-directional locking grooves 245 that receive the lock 250 to retain the locking pin 240 within the aperture 225 of the second end 220. In certain embodiments, the locking pin 240 includes only one locking groove 245, and in certain other embodiments, the locking pin 240 includes three or more locking grooves. The locking pin 240 can optionally include a chamfer 246 at the leading edges of the locking end 244 and/or on the flange 243 to ease assembly of the locking pin 240 with rigging components 201, 202.

Referring now to FIG. 14, one of the multi-directional locking grooves 245 is shown. The groove 245 has three sections: a guide portion 247, a transitional portion 248, and a locking portion 249. These portions 247, 248, 249 combine to form the J-shaped multi-directional locking groove 245. Thus, the grooves 245 may also be referred to as "J-slots." In certain embodiments, the grooves 245 can be formed in a backwards "J" shape and also be referred to as "J-slots." The portions 247, 248, 249 of the grooves 245 have a depth that is slightly larger than the length of the teeth 256B of the key 256 (discussed below). In some exemplary embodiments, the depth of the portions 247, 248, 249 of the grooves 245 range from about 0.125 inches to about 1.5 inches. The depth of the grooves 245 is constant throughout each portion 247, 248, 249. In certain embodiments, the depth of the grooves 245 varies within and/or between the portions 247, 248, 249 of the grooves 245.

The two multi-directional locking grooves 245 are spaced apart from each other on the circumference of the cylindrical body 241 of the locking pin 240. The grooves 245 may be spaced equally or may be unequally spaced apart. In certain embodiments, the locking pin 240 includes at least three, four, six, eight or more grooves 245 that may be equally or unequally spaced apart.

The guide portion 247 has a width 247A and extends for a length 247B in an axial direction away from the locking end 244. The width 247A or arc width of the guide portion 247 may be about 0.1 inches to about 0.9 inches and the length 247B of the guide portion 247 may be about 0.375 inches to about 1.25 inches.

The transitional portion 248 extends in a circumferential direction from the guide portion 247 to the locking portion 249. The transitional portion 248 has a first width 248A where the transitional portion 248 intersects the guide portion 247 and a second width 248B where the transitional portion 248 intersects the locking portion 249. The first width 248A may be about 0.1 inches to about 0.75 inches and the second width 248B may be about 0.2 inches to about 1.0 inch. In certain embodiments, the first and second widths 248A, 248B are percentages, such as about 20 percent to about 50 percent of the length 247B of the guide portion 247. The transitional portion 248 extends for a length or arc length 248C between the guide portion 247 and the locking portion 249. The transitional portion 248 may extend circumferentially in the range of about 70 degrees to about 110 degrees around the circumference of the locking pin 241. In one embodiment, the transitional portion 248 extends circumferentially about 90 degrees around the around the circumference of the locking pin 241. Thus, depending on the diameter of the locking pin 241, the length 248C may vary in different embodiments and for different diameter locking pins 241, The second width 248B of the transitional portion 248 is wider than the first width 248A so that the transitional portion 248 expands in width from the guide portion 247 to the locking portion 249 thereby forming a ramp or slanted side wall 248D. In certain embodiments, the transitional portion 248 has a constant width and extends at an angle from the guide portion 247 to form the slanted side wall 248D. The angle may be about 75 degrees to about 85 degrees from a central axis of the locking pin 240.

The locking portion 249 extends from the transitional portion 248 in an axial direction parallel to the guide portion 247 toward the locking end 244 of the locking pin 240. The locking portion 249 has a width 249A and a length 249B. The width 249A or arc width of the locking portion 249 may be about 0.1 inches to about 0.9 inches. In certain embodiments, the width 249A of the locking portion 249 is equal to the width 247A of the guide portion 247. In certain embodiments, the width 249A of the locking portion 249 is less than the width 247A of the guide portion 247. The length 249B of the locking portion 249 is less than the length 247B of the guide portion 247 and greater than the second width 248B of the transitional portion 248. In certain embodiments, the length 249B of the locking portion 249 is about 50% percent to about 75% of the length 247B of the guide portion 247, or about 50% to about 67% of the length 247B of the guide portion 247.

Figure 15:
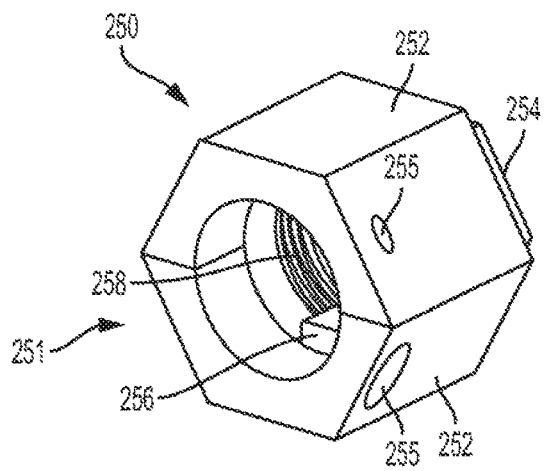
FIG. 15 shows a perspective view of an exemplary lock.
Figure 16:
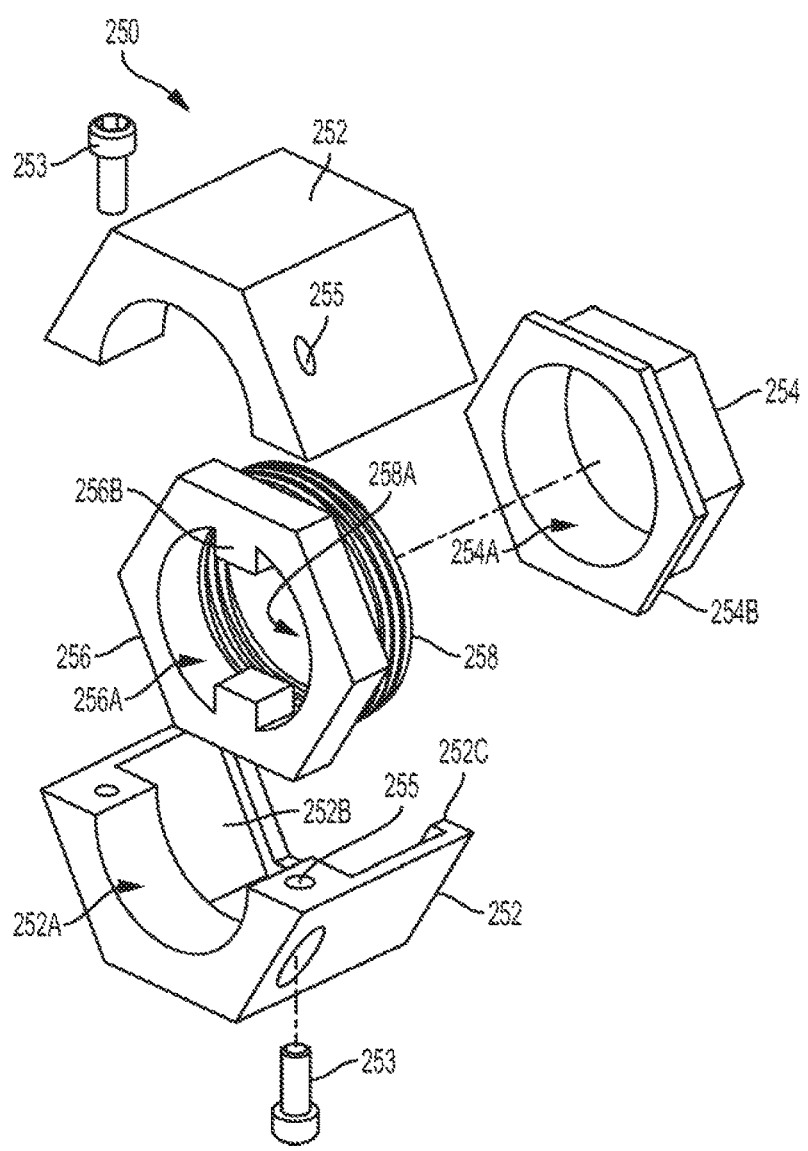
FIG. 16 shows an exploded view of the lock of FIG. 15.

Referring now to FIGS. 15-16, the lock 250 is shown assembled and in an exploded view. The lock 250 has a two-part housing 252, a moveable end 254, a key 256, and a spring member 258. A central opening 251 of the lock 250 is configured to receive the locking end 244 of the locking pin 240 so that the key 256 can engage with the multi-directional locking grooves 245.

The lock housing 252 is formed from two halves that are fastened together with fasteners 253 inserted through threaded openings 255 in each half of the housing 252. The housing 252 has a hexagonal shape to cooperate with a tool such as a hexagonal socket of a wrench so that the lock 250 can be rotated when engaging with the locking grooves 245 of the locking pin 240. In certain embodiments, the housing 252 has a circular shape with flat surfaces or other suitable recesses for cooperating with a corresponding tool so that the lock 250 can be rotated. In certain embodiments, the lock 250 has a triangle, square, or other polygonal shape to engage with a corresponding tool.

The lock housing 252 has a first opening 252A, an internal cavity 252B, and a second opening 252C. The first opening 252A is shaped to receive the locking pin 240. The internal cavity 252B is shaped to engage with the moveable end 254 and the key 256. The first opening 252A, cavity 252B, and second opening 252C can have a similar or different shape, depending on the shape of the corresponding components. When the housing 252 is rotated, the internal cavity 252B engages the moveable end 254 and key 256 so that the housing 252, end 254, and key 256 rotate together.

The moveable end 254 has an opening 254A for receiving the locking pin 240 and a flange 254B that is retained within the internal cavity 252B of the housing 252. The flange 254B is larger than the second opening 252C of the housing 252 so that the moveable end 254 is retained within the housing 252 when assembled with the compressed spring member 258. The moveable end 254 is shown with a hexagonal shape to match the shape of the housing 252, but can have any suitable shape, such as a cylindrical shape. In certain embodiments, the flange 254B has a different shape than the rest of the moveable end.

The key 256 has an opening 256A for receiving the locking pin 240 and teeth 256B protruding into the opening 256A for engaging the locking grooves 245 of the locking pin 240. The number of teeth 256B corresponds to the number of locking grooves 245 of the locking pin 240, for example, the key 256 shown in FIG. 16 has two teeth for engaging the two grooves 245 of the locking pin 240 shown in FIGS. 13-14. The key 256 has a hexagonal shape that corresponds to the shape of the internal cavity 252B of the housing 252 so that the key 256 rotates with the housing 252 as the housing 252 is rotated. Thus, the lock 250 can be rotated to guide the teeth 256B of the key 256 through the grooves 245 of the locking pin 240.

The spring member 258 has an opening 258A for receiving the locking pin 240. The spring member 258 may be any suitable type of spring, such as, for example, the illustrated stack of wave springs, a coil spring, or the like. When the lock 250 is assembled, the spring member 258 is compressed within the internal cavity 252B of the housing 252 between the first opening 252A of the housing 252 and the flange 254B of the moveable end 254. The spring member 258 presses against the moveable end 254 to cause the moveable end 254 to extend outwards from the second opening 252C of the housing 252.

Figure 17:
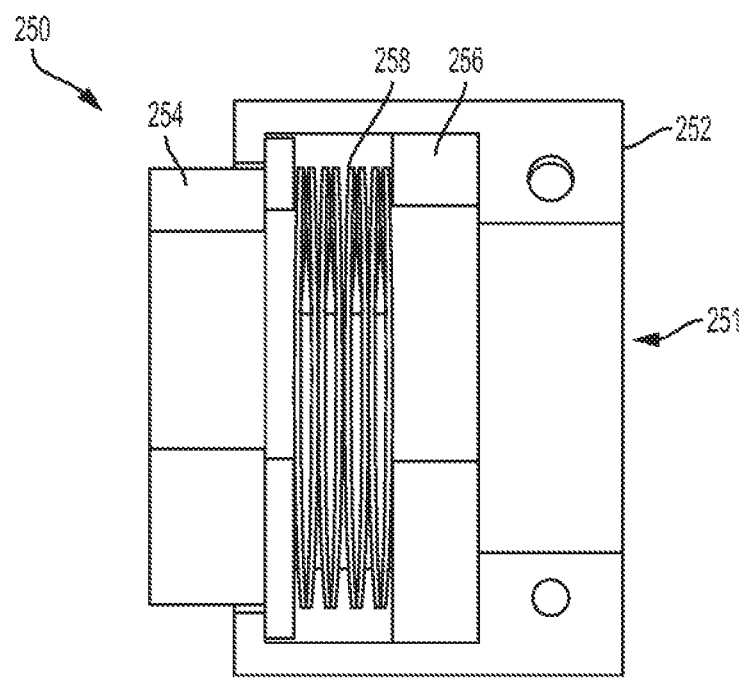
FIG. 17 shows a side view of the lock of FIG. 15 with one housing removed to show the inner end in a resting position.
Figure 18:
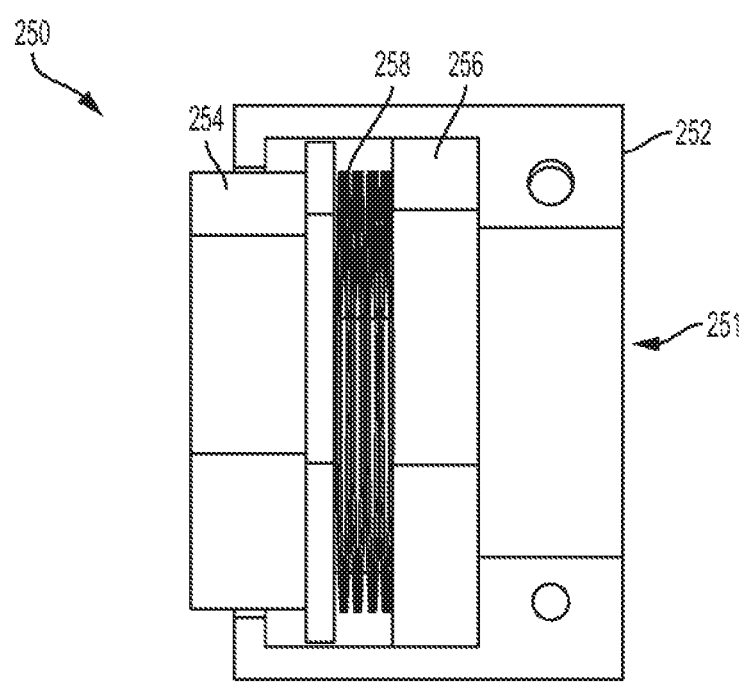
FIG. 18 shows a side view of the lock of FIG. 15 with one housing removed to show the inner end in a compressed position.

Referring now to FIGS. 17-18, the lock 250 is shown with one half of the housing 252 removed to expose the moveable end 254, key 256, and spring member 258. The lock 250 shown in FIG. 17 is in a resting or uncompressed condition. The lock 250 shown in FIG. 18 is in a compressed condition where the moveable end 254 has been pressed into the lock 250 and compressed the spring member 258 against the key 256.

Figure 18A:
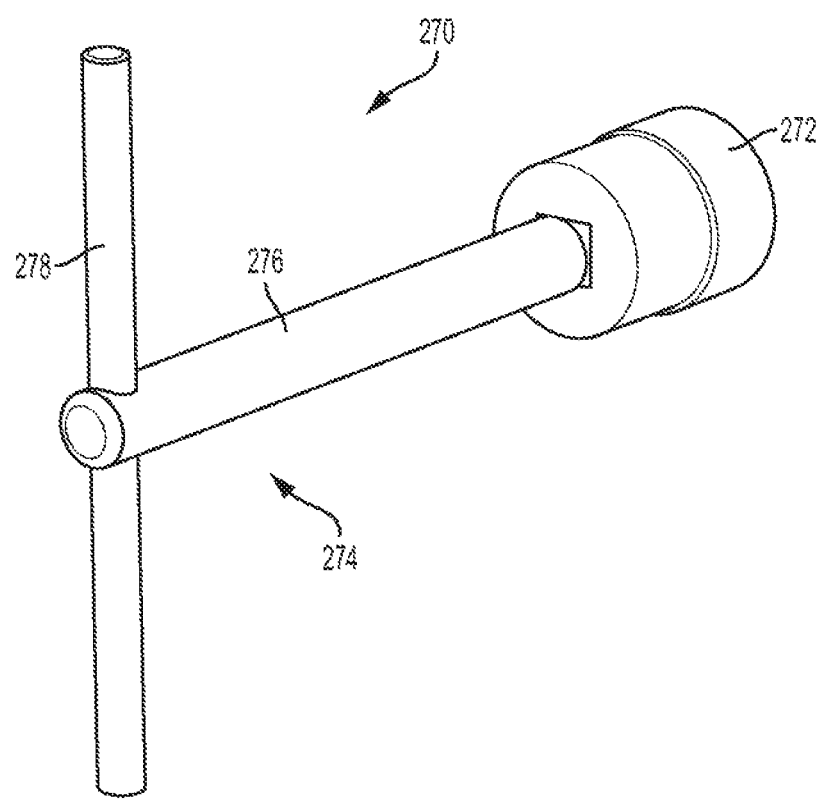
FIG. 18A shows a perspective view of an exemplary socket tool.
Figure 19:
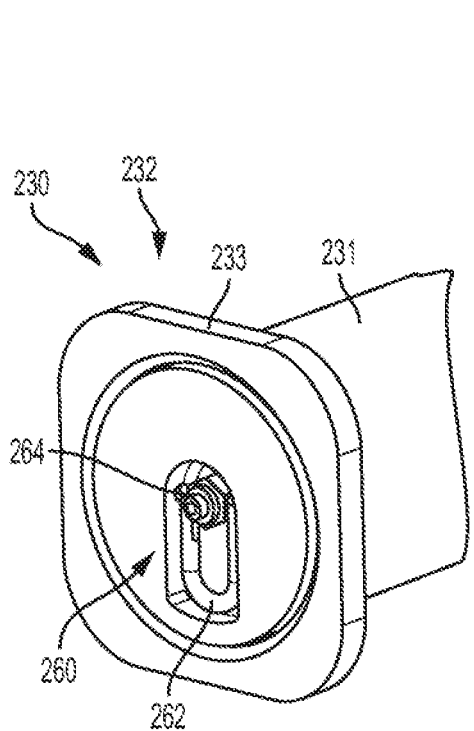
FIG. 19 shows a perspective view of an end of an exemplary rigging pin having a lifting system.
Figure 20:
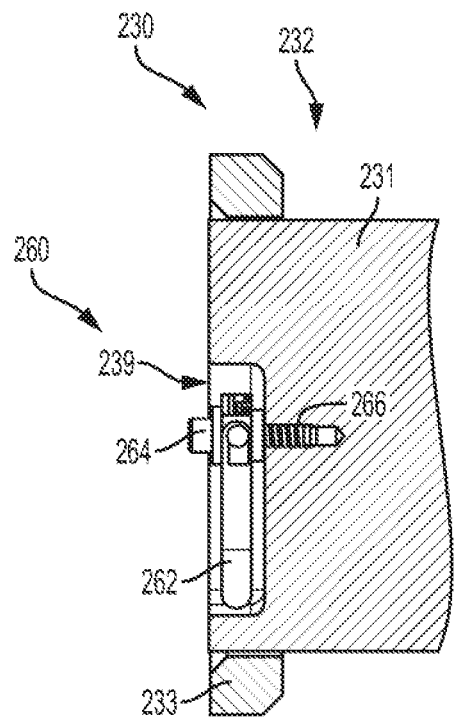
FIG. 20 shows a cross-section view of an end of the rigging pin of FIG. 19.
Figure 21:
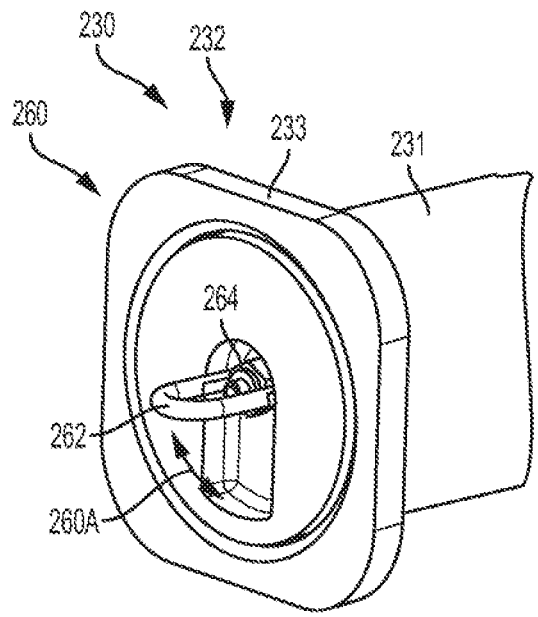
FIG. 21 shows the lifting system of FIG. 19 in a deployed condition.

The lock 250 is assembled to the locking pin 240 by sliding the lock 250 onto the body 241 of the pin 240 by inserting the pin body 241 into the central opening 251 so that the teeth 256B of the key 256 engage the guide portion 247 of the locking groove 245. A socket tool 270, see FIG. 18A, is used compress the lock 250 onto the locking end 244 of the pin 240 to move the teeth 256B along the guide portion 247 to the transitional portion 248. The lock 250 is then rotated clockwise to move the teeth 256B through the transitional portion 248 in the clockwise direction until the teeth 256B engage the locking portion 259. Pressure on the socket tool 270 is then released so that the spring member 258 of the lock 250 expands and moves the teeth 256B axially within the locking portion 259 so that the teeth 256B of the key 256 are captured within the locking grooves 245.

The locking grooves 245 are configured to bias the lock 250 toward remaining attached to the locking pin 240 when subjected to external forces. That is, the spring member 258 expands in a locking direction to retain the teeth 256B of the key 256 in the locking portion 259. Thus, the lock 250 can only be removed by compressing the lock 250 against the pin 240 and rotating the lock 250 so that the teeth 256B of the key 256 clear the slanted side wall 248D of the transitional portion 248 and move into the guide portion 247 where compression forces on the lock 250 can be relaxed to allow the teeth 256B to be withdrawn from the locking groove 245. Removing compression forces on the lock 250 before the teeth 256B are moved into the guide portion 247 will allow the spring member 258 to expand and push the teeth 256B against the slanted side wall 248D, thereby causing the key 256 and lock 250 to rotate in a locking direction as the teeth slide along the slanted wall 248D and into the locking portion 249. Thus, it is difficult for the lock 250 to be removed from the locking pin 240 inadvertently or through accidental collision or engagement with other objects.

The socket tool 270 may be configured in a variety of ways. Any tool capable of compressing the lock 250 onto the locking end 244 of the pin 240 and rotating the lock 250 to move the teeth 256B through the transitional portion 248 and engage the locking portion 259 may be used. In the illustrated embodiment of FIG. 18A, the locking tool 270 includes a socket portion 272 and a handle portion 274 configured to rotate the socket portion 272 about a longitudinal axis. In the illustrated embodiment, the handle portion 274 is configured as a tee bar, having a longitudinal stem 276 and a cross bar 278. The socket portion 272 is configured to fit over the end of the lock housing 252 and mate with the lock housing 252 in order to compressing the lock 250 onto the locking end 244 of the pin 240 and rotating the lock 250.

The components of the dragline bucket rigging equipment 100 that are joined together by the pinned connection 200 are sufficiently large and heavy enough to require the assistance of lifting devices, such as winches and cranes, during assembly of the components. Referring now to FIGS. 19-25, a lifting system 260 for the rigging pin 230 of the pinned connection 200 is shown. The lifting system 260 can be attached to one or both ends of the rigging pin 230. The lifting system 260 can also be attached to other components of the pinned connection 200, such as the rigging components 201, 202 to facilitate lifting and handling with a lifting device.

Figure 22:
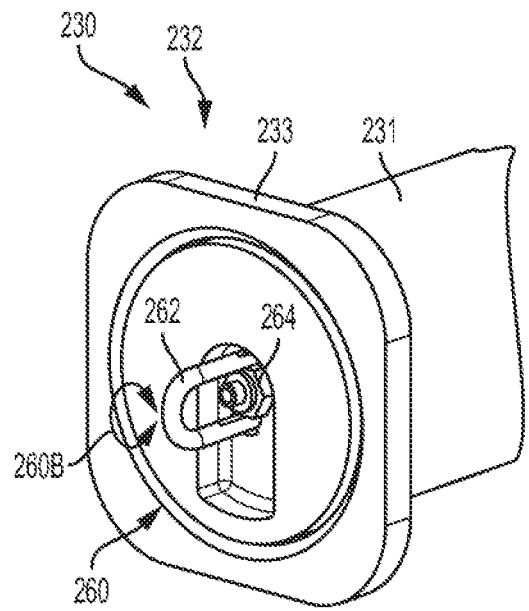
FIG. 22 shows the lifting system of FIG. 19 in a deployed and rotated condition.
Figure 23:
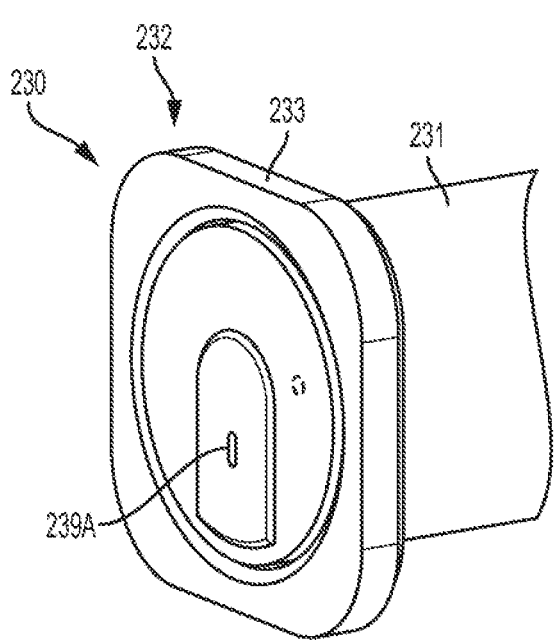
FIG. 23 shows the rigging pin of FIG. 19 with a cover covering the lifting system.
Figure 24:
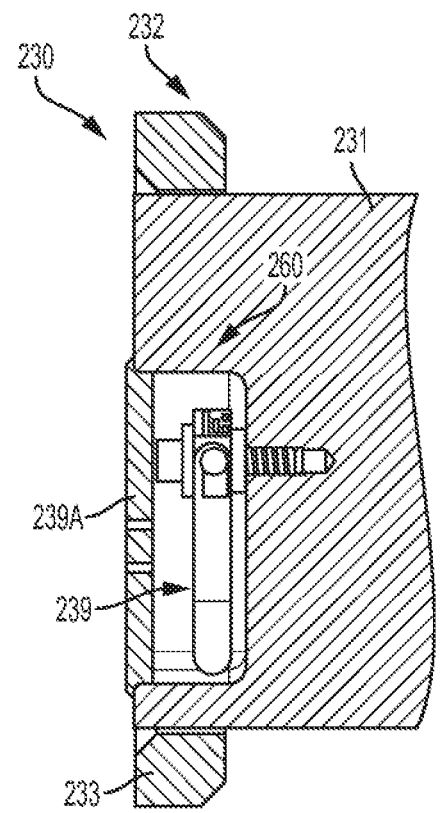
FIG. 24 shows a cross-section view of an end of the rigging pin of FIG. 23.

The lifting system 260 includes a bail or lifting eye 262 and an attachment portion 264. The bail 262 can be engaged by a hook or other engagement portion of a lifting device such as a winch or crane to lift the rigging pin 230. The bail 262 is hingeably and pivotably attached to the attachment portion 264 so that the bail 262 can swing away from the rigging pin 230 along an outward swinging direction 260A (FIG. 21) and pivot around the attachment portion 264 in a pivoting direction 260B (FIG. 22).

Figure 25:
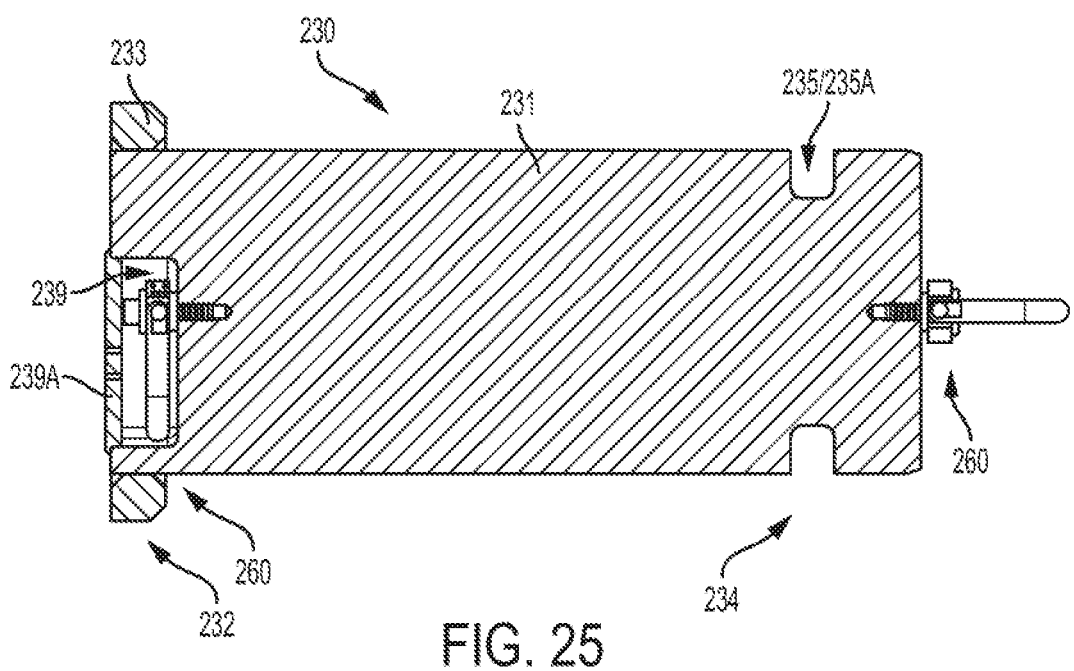
FIG. 25 shows a cross-section view of an exemplary rigging pin having lifting systems at each end.

As can be seen in FIG. 25, the lifting system 260 may be attached to an exterior surface of the rigging pin 230, such as the retention end 234, and/or may be attached within a recess 239. To protect the lifting system 260 when not in use, the recess 239 may be provided with a cover 239A. The cover 239A is formed from a sufficiently tough material to be able to withstand impacts and wear from dirt, rocks, metal. For example, the cover 239A may be formed from plastic, rubber, metal, or the like.

Figure 26:
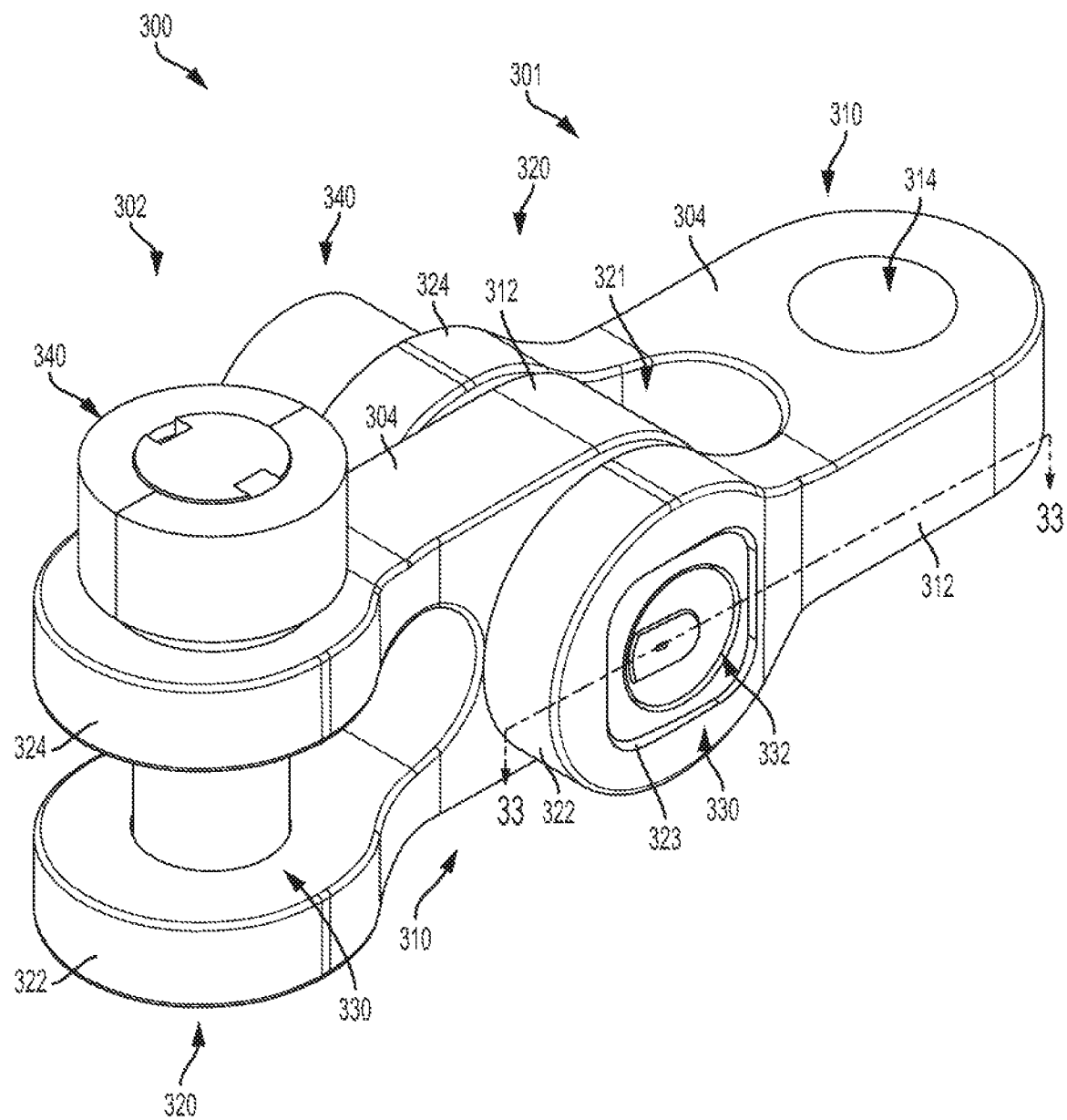
FIG. 26 shows a perspective view of an exemplary pinned connection coupling together two rigging components of a dragline bucket rigging system.
Figure 27:
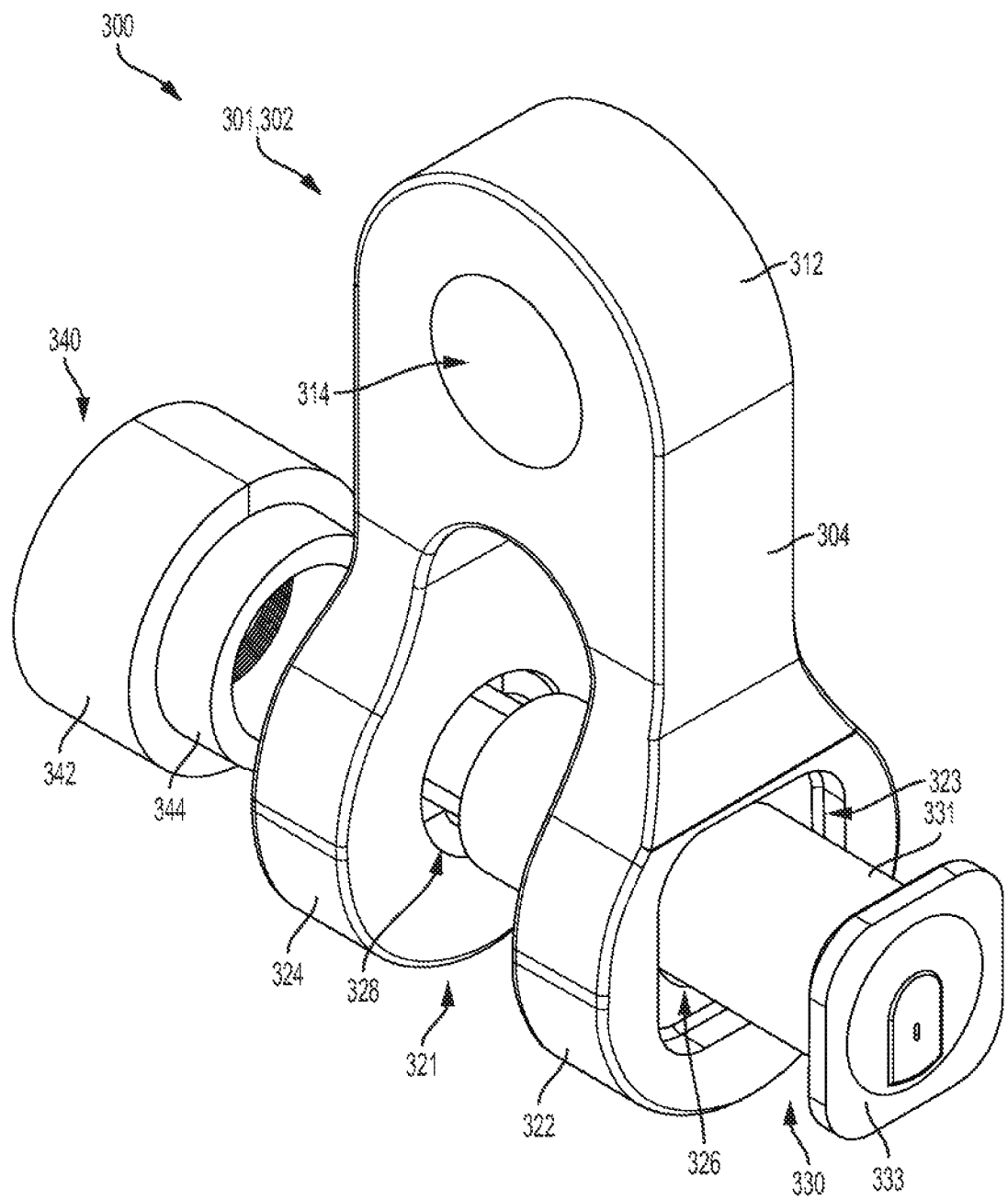
FIG. 27 shows an exploded view of the pinned connection of FIG. 26.

Referring now to FIGS. 26-36, another exemplary embodiment of a pinned connection 300 and components thereof are shown. Referring now to FIGS. 26-27, assembled and exploded views are shown of a pinned connection assembly 300 coupling together two example rigging components of dragline bucket rigging equipment. The rigging components shown in FIGS. 26-27 are similar to the opposite plane links described above (e.g., the hoist link 126), however, the rigging components can be any rigging components suitable for coupling by a pinned connection.

The two pinned coupling components shown in FIG. 26 are referred to as first and second rigging components 301, 302 and are coupled together with a rigging pin 330 retained in the first rigging component 301 by a lock 340. The first and second rigging components 301, 302 of the pinned connection 300 are thus able to rotate relative to each other about the rigging pin 330, that is, a central axis of the rigging pin 330 is the rotational axis of the pinned connection 300.

Referring now to FIGS. 26-32, the rigging components 301, 302 have first and second ends 310, 320 that can be male or female ends. In the illustrated embodiment, the first ends 310 are male ends and the second ends 320 are female ends. In certain embodiments, both ends of one rigging component are female ends that couple to male ends of other rigging components. In certain other embodiments, both ends of one rigging component are male ends that couple to female ends of other rigging components.

The first and second ends 310, 320 extend from an intermediate portion or body 304. In certain embodiments, the first end 310 extends in a direction opposite from the second end 320. In other embodiments, the first end 310 extends in a direction orthogonal to the second end 320, or any other angular relationship. The rigging components 301, 302 may also include other ends for linking together two or more additional components (e.g., the pick up link 124 described above).

The first (male) end 310 includes an end link 312. The end link 312 includes an end link coupling aperture 314 for receiving the rigging pin 330 during assembly of the pinned connection 300. In certain embodiments, the end link aperture 314 includes a bushing (not shown) that can be removed and replaced after being worn down during use. The bushing prohibits the aperture 314 from experiencing mechanical wear resulting from movement between the components of the pinned connection 300.

The second (female) end 320 includes first and second arms 322, 324 that extend from the intermediate portion 304 to form a U-shaped bracket. The first and second arms 322, 324 are spaced apart to form an opening 321 for receiving the end link 312 of the first end 310. For example, as shown in FIG. 26, the first end 310 of the second rigging component 302 is received within the opening 321 of the first rigging component 301.

The first and second arms 322, 324 each include a coupling aperture for receiving the rigging pin 330. As can be seen in FIG. 27, the first arm 322 includes a first arm coupling aperture 326 and the second arm 324 includes a second arm coupling aperture 328. During assembly of the pinned connection 300, the rigging components 301, 302 are arranged so that the aperture 314 of the first end 310 is aligned with the apertures 326, 328 of the second end 320. The rigging pin 330 is then inserted through the first arm aperture 326, the end link aperture 314, and the second arm aperture 328 to couple the rigging components 301, 302, thereby forming the pinned connection 300.

The first arm 322 includes a counterbore 323 that is larger than the aperture 326. The counterbore 323 is shaped to receive a flange 333 of the rigging pin 330. In certain embodiments, the flange 333 and counterbore 323 cooperate together to prevent rotation of the rigging pin 330 relative to the rigging component 301, 302. For example, in the embodiment shown in FIG. 26, the flange 333 and counterbore 323 both have a rounded square shape so that the flange 333 of the rigging pin 330 engages the counterbore 323 and is prohibited from rotating. Any other shape suitable for prohibiting rotation of the rigging pin may be used for the counterbore and flange. Alternatively, in certain embodiments, the first arm includes protrusions that restrict the rotational movement of the flange of the rigging pin.

The second arm 324 includes a counterbore 325 that is larger than the aperture 328. The counterbore 325 is shaped to receive a moveable end 344 of the lock 340 and to allow rotation of the moveable end 344 so that the lock 340 can be assembled to the rigging pin 330. The moveable end 344 engages and pushes against the counterbore 325 during assembly of the lock 340 to the rigging pin 330.

Figure 28:
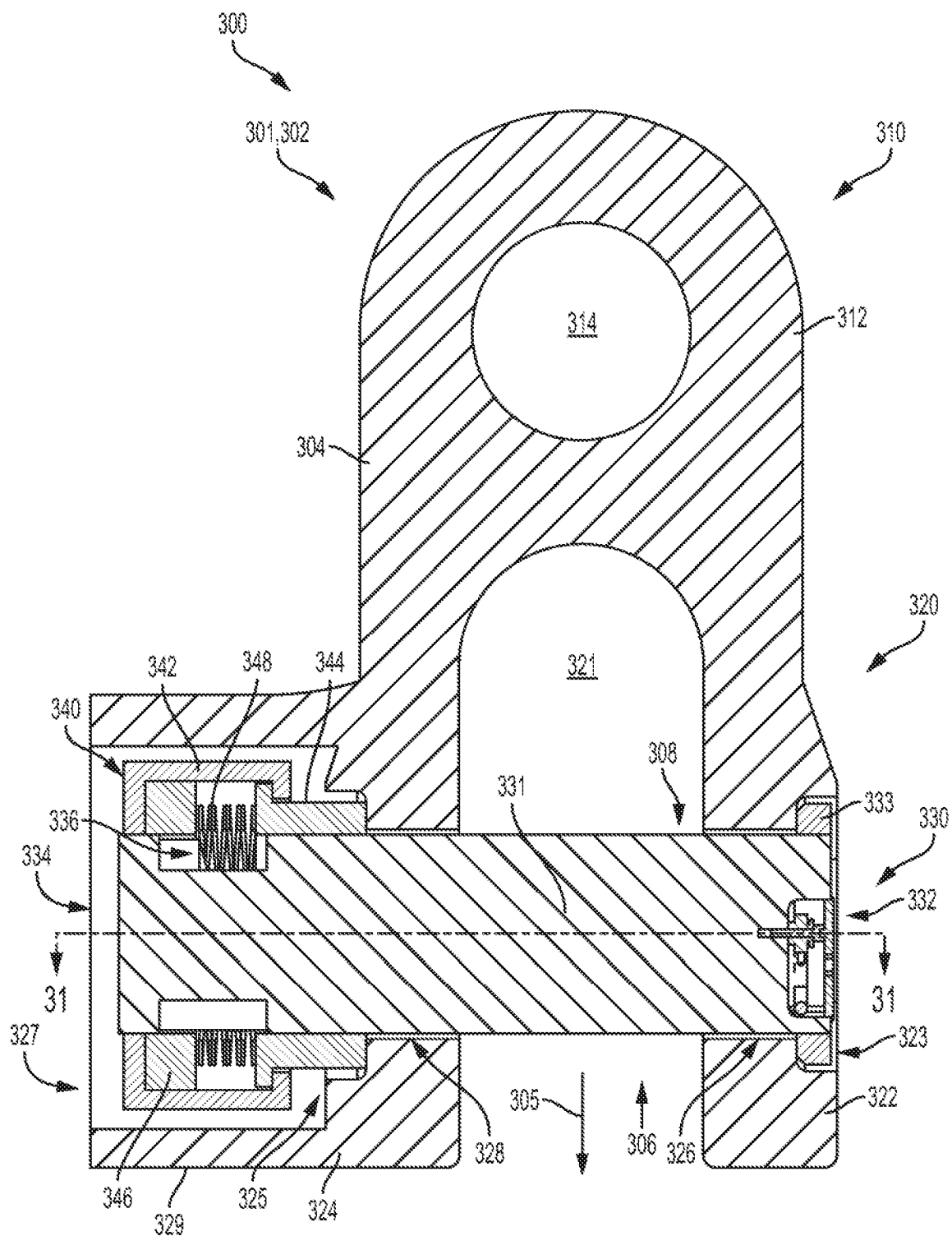
FIG. 28 shows a cross-section view of the pinned connection of FIG. 26 along the plane indicated by line 30-30 in FIG. 26.
Figure 29:
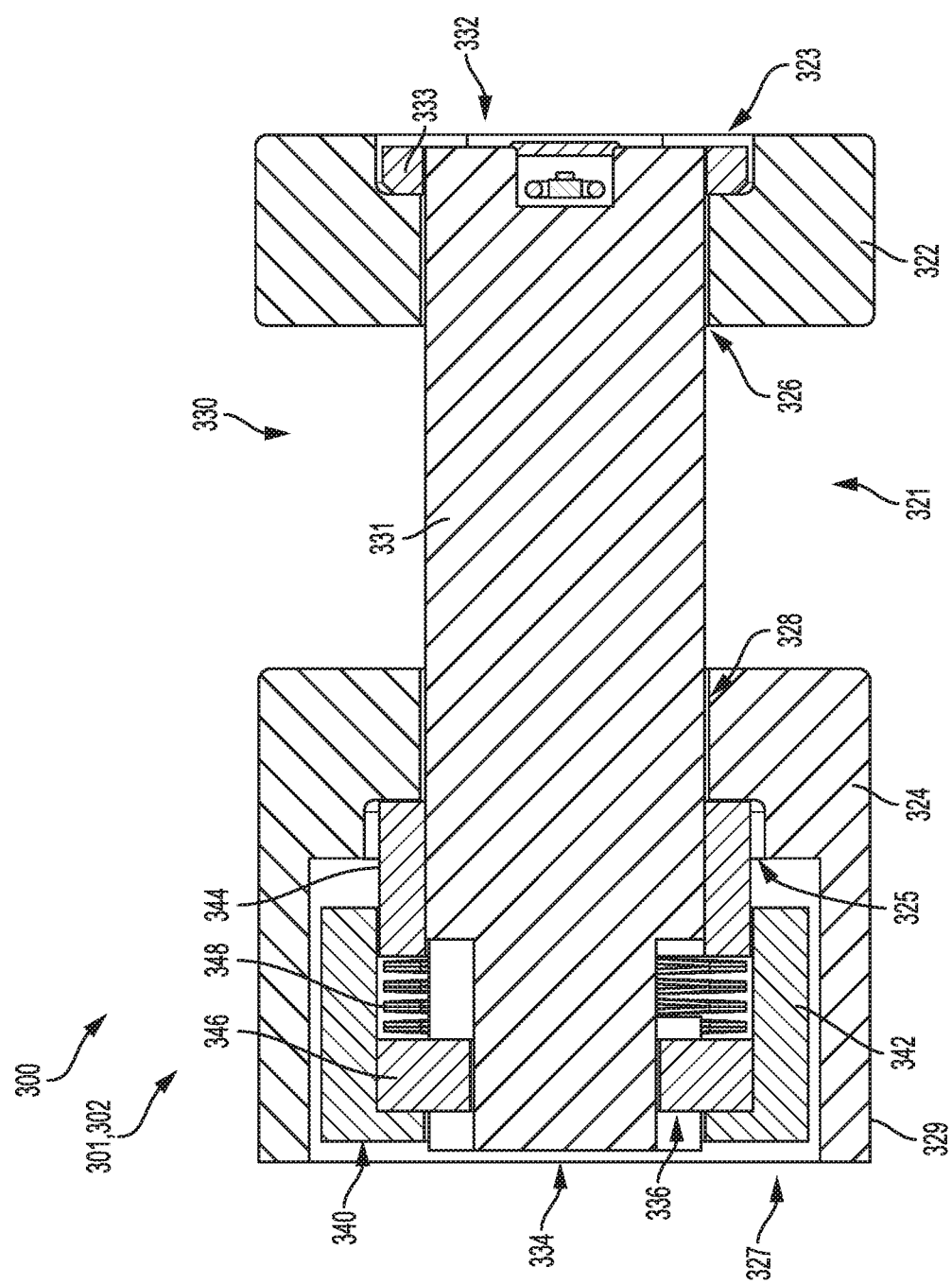
FIG. 29 shows a cross-section view of the pinned connection of FIG. 26 along the plane indicated by line 31-31 in FIG. 28.

In some embodiments, as shown in FIGS. 28 and 29), the second arm 324 includes a pocket 327 that receives the lock 340. The pocket 327 is defined by sidewalls 329 that extend outward past the lock 340 when the lock 340 is installed on the rigging pin 330. The pocket 327 is configured to protect the lock 340 during digging operations.

The rigging pin 330 includes a cylindrical body 331 extending away from a flange end 332 to a locking end 334 (FIG. 28). In certain embodiments, the rigging pin 330 has a diameter of about three inches to about twelve inches. However, the rigging pin 330 may be any size as desirable for its intended purpose. The flange end 332 includes the flange 333 that is received in the counter bore 323 of the first arm 322, as described above. In certain embodiments, the direction of the rigging pin 330 is reversed such that the flange 333 is received in a counterbore (not shown) formed in the second arm 324.

The retention end 334 includes multi-directional locking grooves 336 for receiving the lock 340 to retain the rigging pin 330 within the apertures 326, 328. The locking grooves 336 and lock 340 are discussed further, below. In certain embodiments, the rigging pin 330 is longer than the rigging pin 230—i.e., the rigging pin 330 extends away from the second arm 324 further than the rigging pin 230 extends from the second arm 224—to provide space for the lock 340 to be received within the locking grooves 336.

The locking grooves 336 described above can be arranged in various configurations. For example, such locking grooves 336 may be provided at both ends of the rigging pin 330 so that the rigging pin 330 does not have a flange end 332 but two retention ends 334 instead. In such an embodiment, an additional lock 340 is provided to retain each end of the rigging pin 330. Thus, in certain embodiments, locks 340 are employed to retain the rigging pin 330. Consequently, the rigging pin 330 may be longer to accommodate the additional locking grooves 336 for receiving locks 340 at both ends of the rigging pin 330.

The rigging pin 330 can optionally include a chamfer 335 at the leading edges of the flange 333 and/or retention end 334 (not shown) to ease assembly of the rigging pin 330 with rigging components 301, 302. In certain embodiments, the rigging pin 330 includes one or more lifting systems like the lifting system 260 shown in FIGS. 19-25. The lifting system 260 enables the rigging pin 330 to be lifted with a crane, winch, or other lifting device.

The lock 340 a two-part housing 342, a moveable end 344, a key 346, and a spring member 348. A central opening 341 (FIG. 35) of the lock 340 is configured to receive the locking end 334 of the rigging pin 330 so that the key 346 can engage with the multi-directional locking grooves 336.

Referring now to FIGS. 28-29, cross-sectional views of the pinned connection 300 are shown, with FIG. 29 showing a cross-section through the center of the rigging pin 330. During operation of dragline bucked rigging equipment that includes pinned connections 300, a load 305 oriented away from the intermediate body 304 of the rigging component 301, 302 is applied on the rigging pin 330 by the end link 312 (not shown) of another rigging component (not shown).

When the load 305 is applied to the rigging pin 330, the pin 330 shifts towards the direction of the load 305 within the apertures 326, 328 of the first and second arms 322, 324. A loaded side 306 of the rigging pin 330—i.e., the side of the pin 330 facing the source of the load 305—is pulled against the sidewall of the apertures 326, 328. An unloaded side 308 of the rigging pin 330—i.e., the side of the pin 330 facing away from the source of the load 305—moves away from the sidewall of the apertures 326, 328, thereby increasing the space between the rigging pin 330 and the sidewall of the apertures 326, 328.

As can be seen in FIG. 28, the lock 340 is received within the counterbore 325 of the second arm 324. The counterbore 325 can be any shape suitable for receiving the lock 340. In certain embodiments, the counterbore 325 is also shaped to receive portions of a tool (not shown) used to install the lock 340. The diameter of the moveable end 344 of the lock 340 is larger than the diameter of the aperture 328 so that the rigging pin 330 is retained by the lock 340 within the rigging component 301, 302 when the rigging pin 330 is subjected to the load 305.

Figure 32:
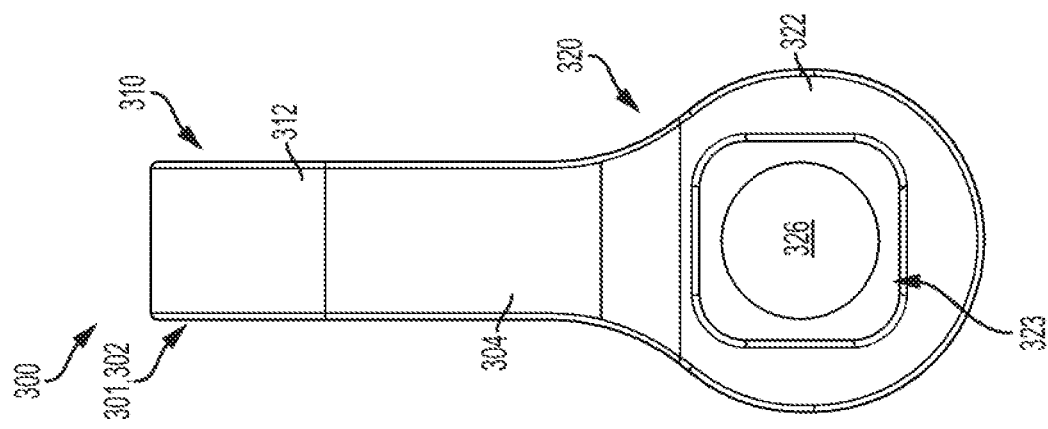
FIG. 32 shows a left side view of the exemplary rigging component of FIG. 30.
Figure 31:
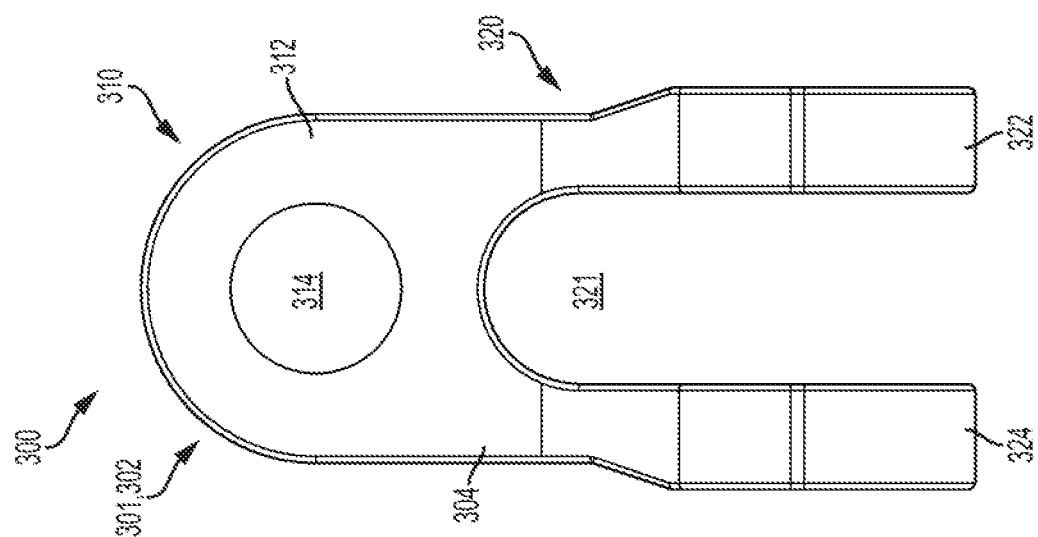
FIG. 31 shows a front view of the exemplary rigging component of FIG. 30.
Figure 30:
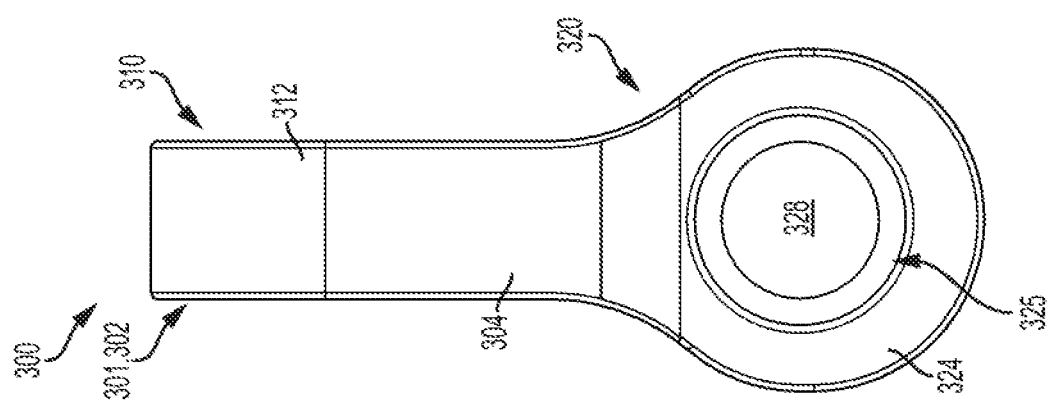
FIG. 30 shows a left side view of another exemplary rigging component.

Referring now to FIGS. 30-32, left side, front, and right side views of the rigging component 301, 302 are shown. FIG. 31 clearly shows the U-shaped opening 321 defined by the first and second arms 322, 324 of the second end 320. The circular counterbore 325 in the second arm 324 is shown clearly in FIG. 30, and the rounded square shaped counterbore 323 in the first arm 322 is shown clearly in FIG. 8. The illustrated rigging component 301, 302 is symmetrical from side-to-side and front-to-back. However, the rigging component 301, 302 can take on any suitable shape for joining together various components of a dragline bucket rigging system.

Figure 33:
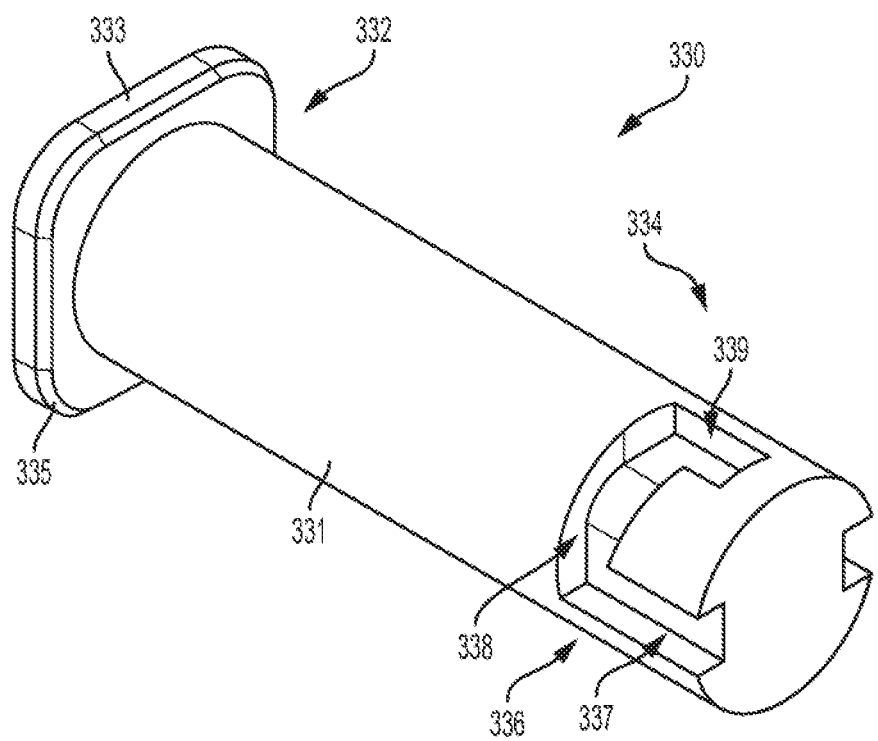
FIG. 33 shows a perspective view of another exemplary rigging pin.
Figure 34:
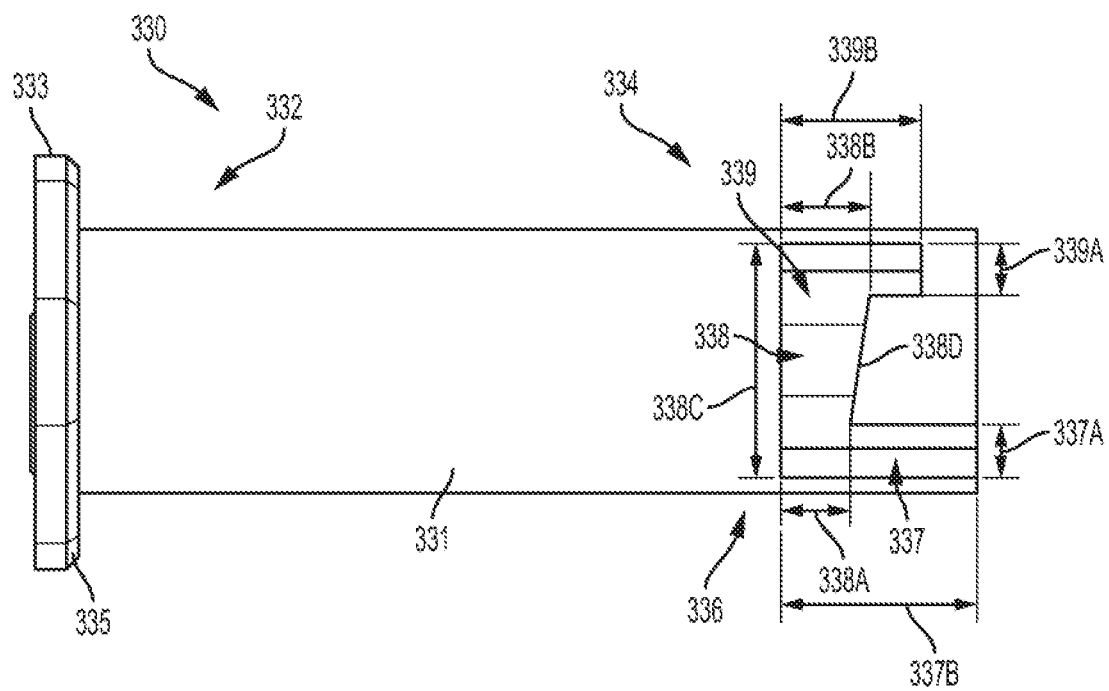
FIG. 34 shows a right side view of the rigging pin of FIG. 33.

Referring now to FIGS. 33-34, perspective and side views of the rigging pin 330 are shown. As was described above, the cylindrical body 331 of the rigging pin 330 extends away from the flange end 332 to the locking end 334. The flange end 332 includes the flange 333 that is received in the counter bore 323 of the first arm 322. The locking end 334 includes two multi-directional locking grooves 336 for engaging the lock 340 to retain the rigging pin 330 within the apertures 326, 328 of the second end 320. In certain embodiments, the rigging pin 330 includes only one locking groove 346, and in certain other embodiments, the rigging pin 330 includes three or more locking grooves. The rigging pin 330 can optionally include a chamfer 335 at the leading edges of the retention end 334 and/or on the flange 333 to ease assembly of the rigging pin 330 with rigging components 301, 302. The rigging pin 330 can optionally include a lifting system like that shown in FIGS. 19-25 and described above.

Referring now to FIG. 34, one of the multi-directional locking grooves 336 is shown. The groove 336 has three portion: a guide portion 337, a transitional portion 338, and a locking portion 339. These portions 337, 338, 339 combine to form the J-shaped multi-directional locking groove 336. Thus, the grooves 336 may also be referred to as "J-slots." In certain embodiments, the grooves 336 can be formed in a backwards "J" shape and also be referred to as "J-slots." The portions 337, 338, 339 of the grooves 336 have a depth that is slightly larger than the length of the teeth 356B of the key 356 (discussed below). In some exemplary embodiments, the depth of the portions 337, 338, 339 of the grooves 336 range from about 0.125 inches to about 1.5 inches. The depth of the grooves 336 is constant throughout each portion 337, 338, 339. In certain embodiments, the depth of the grooves 336 varies within and/or between the portions 337, 338, 339 of the grooves 336.

The two multi-directional locking grooves 336 are spaced apart from each other on the circumference of the cylindrical body 331 of the rigging pin 330. The grooves 336 may be spaced equally or may be unequally spaced apart. In certain embodiments, the rigging pin 330 includes at least three, four, six, eight or more grooves 336 that may be equally or unequally spaced apart.

The guide portion 337 has a width 337A and extends for a length 337B in an axial direction away from the locking end 334. The width 337A or arc width of the guide portion 337 may be about 0.5 inches to about 2 inches and the length 337B of the guide portion 337 may be about 0.5 inches to about 4.0 inches.

The transitional portion 338 extends in a circumferential direction from the guide portion 337 to the locking portion 339. The transitional portion 338 has a first width 338A where the transitional portion 338 intersects the guide portion 337 and a second width 338B where the transitional portion 338 intersects the locking portion 339. The first width 338A may be about 0.5 inches to about 2.0 inches and the second width 338B may be about 0.75 inches to about 2.25 inches. In certain embodiments, the first and second widths 338A, 338B are percentages, such as about 30 percent to about 50 percent of the length 337B of the guide portion 337. The transitional portion 338 extends for a length or arc length 338C between the guide portion 337 and the locking portion 339. The transitional portion 338 may extend circumferentially in the range of about 45 degrees to about 90 degrees around the circumference of the rigging pin 330. Thus, depending on the diameter of the rigging pin 330, the length 338C may vary in different embodiments and for different diameter rigging pins 330.

The second width 338B of the transitional portion 338 is wider than the first width 338A so that the transitional portion 338 expands in width from the guide portion 337 to the locking portion 339 thereby forming a ramp or slanted side wall 338D. In certain embodiments, the transitional portion 338 has a constant width and extends at an angle from the guide portion 337 to form the slanted side wall 338D. The angle may be about 75 degrees to about 85 degrees from a central axis of the rigging pin 330.

The locking portion 339 extends from the transitional portion 338 in an axial direction parallel to the guide portion 337 toward the locking end 334 of the rigging pin 330. The locking portion 339 has a width 339A and a length 339B. The width 339A or arc width of the locking portion 339 may be about 0.5 inches to about 2.0 inches. In certain embodiments, the width 339A of the locking portion 339 is equal to the width 337A of the guide portion 337. In certain embodiments, the width 339A of the locking portion 339 is less than the width 337A of the guide portion 337. The length 339B of the locking portion 339 is less than the length 337B of the guide portion 337 and greater than the second width 338B of the transitional portion 338. In certain embodiments, the length 339B of the locking portion 339 is about 75 percent of the length 337B of the guide portion 337.

Figure 35:
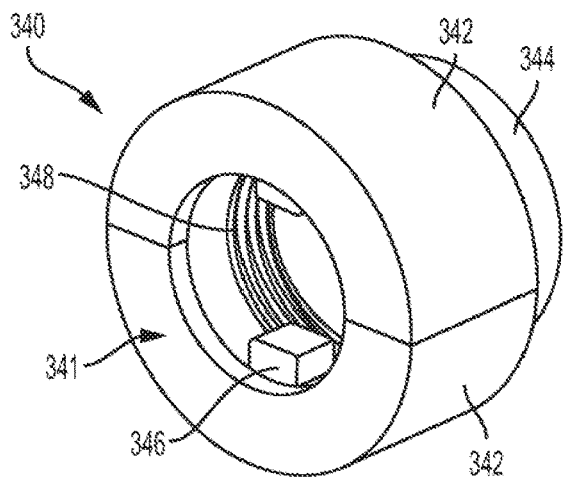
FIG. 35 shows a perspective view of another exemplary lock.
Figure 36:
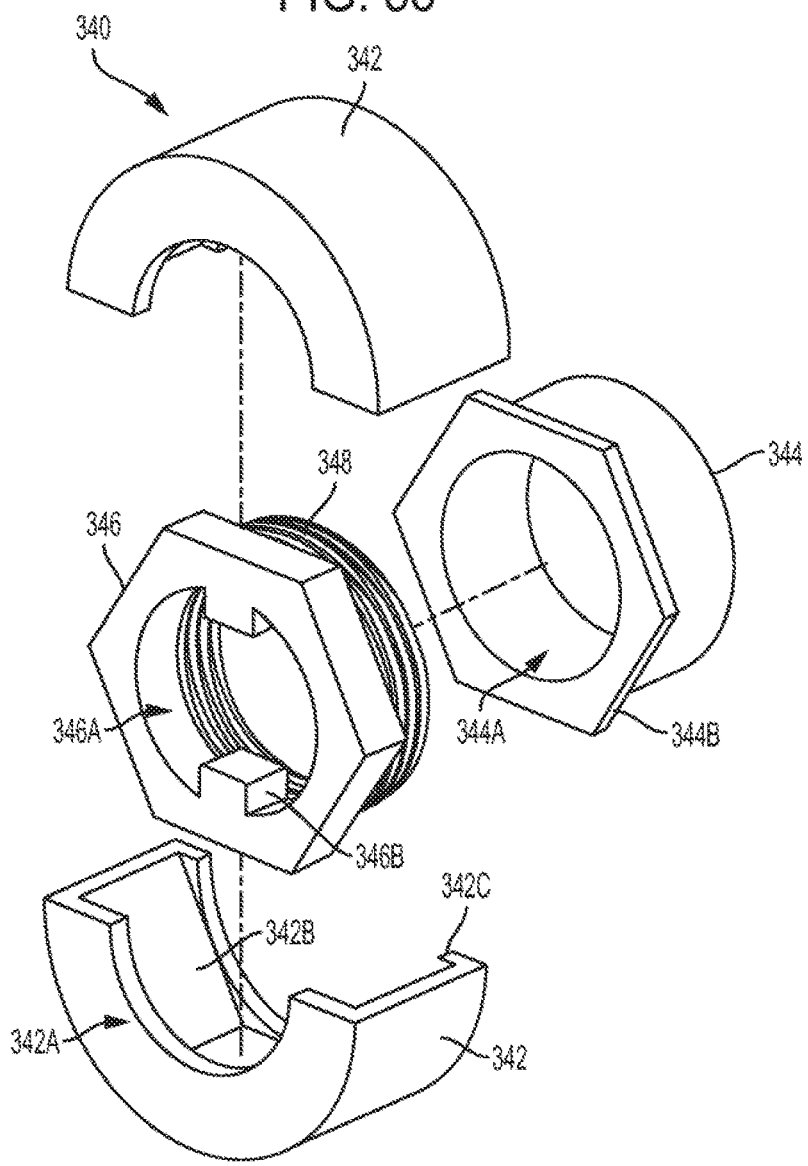
FIG. 36 shows an exploded view of the lock of FIG. 35.

Referring now to FIGS. 35-36, the lock 340 is shown assembled and in an exploded view. The lock 340 has a two-part housing 342, a moveable end 344, a key 346, and a spring member 348. A central opening 341 of the lock 340 is configured to receive the locking end 334 of the rigging pin 330 so that the key 346 can engage with the multi-directional locking grooves 336.

The lock housing 342 is formed from two halves that are fastened together with fasteners (not shown) inserted through threaded openings (not shown) in each half of the housing 342. The housing is shown with a cylindrical shape and can include features such as protrusions, recesses, or flat surfaces for engaging a tool to facilitate rotation of the lock 340 on the rigging pin 330. In certain embodiments, the lock 340 has a triangle, square, or other polygonal shape to engage with a corresponding socket tool.

The lock housing 342 has a first opening 342A, an internal cavity 342B, and a second opening 342C. The first opening 342A is shaped to receive the rigging pin 330. The internal cavity 342B is shaped to engage with the moveable end 344 and the key 346. The first opening 342A, cavity 342B, and second opening 342C can have a similar or different shape, depending on the shape of the corresponding components. When the housing 342 is rotated, the internal cavity 342B engages the moveable end 344 and key 346 so that the housing 342, end 344, and key 346 rotate together.

The moveable end 344 has an opening 344A for receiving the rigging pin 330 and a flange 344B that is retained within the internal cavity 342B of the housing 342. The flange 344B is larger than the second opening 342C of the housing 342 so that the moveable end 344 is retained within the housing 344 when assembled with the compressed spring member 348. The moveable end 344 is shown with a cylindrical shape to match the shape of the housing 342, but can have any suitable shape, such as a hexagonal shape. The flange 344B has a hexagonal shape to engage with the cavity 342B of the housing 342. In certain embodiments, the flange 344B has the same shape than the rest of the moveable end.

The key 346 has an opening 346A for receiving the rigging pin 330 and teeth 346B protruding into the opening 346A for engaging the locking grooves 336 of the rigging pin 330. The number of teeth 346B corresponds to the number of locking grooves 336 of the rigging pin 330, for example, the key 346 shown in FIG. 36 has two teeth for engaging the two grooves 336 of the rigging pin 330 shown in FIGS. 33-34. The key 346 has a hexagonal shape that corresponds to the shape of the internal cavity 342B of the housing 342 so that the key 346 rotates with the housing 342 as the housing 342 is rotated. Thus, the lock 340 can be rotated to guide the teeth 346B of the key 346 through the grooves 336 of the rigging pin 330.

The spring member 348 has an opening 348A for receiving the rigging pin 330. The spring member 348 may be any suitable type of spring, such as, for example, the illustrated stack of wave springs, a coil spring, or the like. When the lock 340 is assembled, the spring member 348 is compressed within the internal cavity 342B of the housing 342 between the first opening 342A of the housing 342 and the flange 344B of the moveable end 344. The spring member 348 presses against the moveable end 344 to cause the moveable end 344 to extend outwards from the second opening 342C of the housing 342.

The lock 340 is assembled to the rigging pin 330 by sliding the lock 340 onto the body 331 of the pin 330 by inserting the pin body 331 into the central opening 341 so that the teeth 346B of the key 346 engage the guide portion 337 of the locking grooves 336. A tool (not shown) is used compress the lock 340 onto the locking end 334 of the pin 330 to move the teeth 346B along the guide portion 337 to the transitional portion 338. The lock 340 is then rotated clockwise to move the teeth 346B through the transitional portion 338 in the clockwise direction until the teeth 346B engage the locking portion 339. Pressure on the lock 340 is then released so that the spring 338 of the lock 340 expands and moves the teeth 346B axially within the locking portion 339 so that the teeth 346B of the key 346 are captured within the locking portion 339.

The locking grooves 336 are configured to bias the lock 340 toward remaining attached to the rigging pin 330 when subjected to external forces. That is, the spring member 348 expands in a locking direction to retain the teeth 346B of the key 346 in the locking portion 339. Thus, the lock 340 can only be removed by compressing the lock 340 against the pin 330 and rotating the lock 340 so that the teeth 346B of the key 346 clear the slanted side wall 338D of the transitional portion 338 and move into the guide portion 337 where compression forces on the lock 340 can be relaxed to allow the teeth 346B to be withdrawn from the locking groove 336. Removing compression forces on the lock 340 before the teeth 346B are moved into the guide portion 337 will allow the spring member 348 to expand and push the teeth 346B against the slanted side wall 338D, thereby causing the key 346 and lock 340 to rotate in a locking direction as the teeth slide along the slanted wall 348D and into the locking portion 339. Thus, it is difficult for the lock 340 to be removed from the rigging pin 330 inadvertently or through accidental collision or engagement with other objects.

Existing rigging components may be retrofitted to enable coupling using the components and concepts embodied by the pinned connections 200, 300 described above. For example, a housing having a locking aperture for receiving a locking pin to engage a retention groove of a rigging pin may be attached to one or both sides of the rigging components. Such a housing may be attached via welding, fastening, or the like. In certain embodiments, the housing may be held in place by the coupling of the pinned connection itself.

INDUSTRIAL APPLICABILITY

Dragline bucket rigging equipment can be used for mining applications and general earth moving operations. Dragline bucket rigging equipment generally includes a dragline bucket that engages the ground and excavates soil, dirt, rocks and the like from the ground. The displaced earth, sometimes known as overburden, may be displaced to uncover ore, minerals, metals, or the like.

Components of the dragline bucket rigging equipment can be connected or coupled together by a pinned connection. These pinned connections typically involve a pin and welded retainers. Pinned connections between the various components of the dragline bucket rigging equipment may experience wear in areas where surfaces of the components bear against each other and are subjected to tensile, compressive, abrasive, or various other forces. Given the effects of the abrasion and stresses, the various components of the dragline bucket rigging equipment are subject to maintenance, which may involve inspecting, disassembling, repairing, and/or replacing the components. The dragline bucket rigging equipment is usually halted during maintenance, which has a limiting effect upon the overall efficiency of the equipment. In order to inspect, repair, or replace pinned connections, it is common for the welded retainers to be removed to provide access to the pin, which typically involves cutting at least one of the welded retainers with a welding torch.

A pinned connection, such as the pinned connections 200, 300 described above, provide a quicker and less costly method of coupling two rigging components of the dragline bucket rigging equipment. For example, the pinned connections 200, 300 can be used to couple together the rigging components 201, 202, 301, 302 (respectively) without using a welding torch to weld the rigging pins 230, 330 or any retention devices such as the locking pin 240, lock 250, and lock 340. The pinned connections 200, 300 can also be decoupled without the use of a welding torch or other device that cuts away or removes material from the pinned connections 200, 300.

By eliminating the step of welding, the coupling and decoupling of the pinned connections 200, 300 described above is performed faster than prior art processes. The components are also less likely to be damaged during the coupling or decoupling process. It should also be noted that non-standard tools are not required to assemble the pinned connections 200, 300 described above, thereby reducing cost further.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, alternatives as to form, fit, and function, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein.

What is claimed is:

1. A pinned connection assembly comprising:
 a first rigging component having an end with at least one coupling aperture and at least one retention aperture that is transverse to the coupling aperture, wherein the retention aperture extends through an entirety of the end of the first rigging component from a first counterbore of the retention aperture to a second counterbore of the retention aperture;

a second rigging component having an end with at least one coupling aperture;

a rigging pin inserted through the coupling apertures of the first and second rigging components, the rigging pin having an end with a retention groove;

a locking pin inserted through the retention aperture of the first rigging component and through the retention groove of the rigging pin, the locking pin having a first end disposed in the first counterbore of the retention aperture, and a second end disposed in the second counterbore of the retention aperture, wherein the second end of the locking pin includes at least one multi-directional locking groove; and a lock selectively coupled to the second end of the locking pin, the lock including:
  a housing configured to extend entirely around the second end of the locking pin;
  a moveable end at least partially disposed within the housing and configured to extend entirely around the locking pin;
  a key at least partially disposed within the housing and configured to extend entirely around the locking pin, wherein the key is further configured to engage the multi-directional locking groove of the locking pin; and
  a spring member disposed within the housing and compressed between the key and the moveable end;
  wherein housing is sized to nest entirely within the second counterbore of the retention aperture.

2. The pinned connection assembly of claim 1, wherein the multi-directional locking groove comprises:
  a guide portion extending axially from the second end of the locking pin;
  a transition portion extending circumferentially from the guide portion; and
  a locking portion extending axially toward the second end of the locking pin from the transition portion.

3. The pinned connection assembly of claim 2, wherein the transition portion has a first width coinciding with the guide portion and a second width coinciding with the locking portion, the second width being wider than the first width.

4. The pinned connection assembly of claim 3, wherein the transition portion includes a slanted side wall disposed at an angle of about 75 degrees to about 85 degrees from a longitudinal axis of the locking pin.

5. The pinned connection assembly of claim 2, wherein a length of the locking portion is about 75 percent of a length of the guide portion.

6. The pinned connection assembly of claim 1, wherein the at least one retention groove of the rigging pin is a circumferential groove.

7. The pinned connection assembly of claim 1, wherein:
  the rigging pin comprises a flange end with a flange; and
  the coupling aperture of the first rigging component has a counterbore shaped to receive the flange of the rigging pin.

8. The pinned connection assembly of claim 1, wherein the rigging pin further comprises a lifting system comprising a bail and an attachment portion.

9. The pinned connection assembly of claim 1, wherein the rigging pin further comprises a lifting system comprising a bail and an attachment portion.

10. A pinned connection assembly comprising:
  a first rigging component having an end with at least one coupling aperture defining a first counterbore;
  a second rigging component having an end with at least one coupling aperture defining a second counterbore, the end of the second rigging component further including sidewalls defining a pocket adjacent the second counterbore;
  a rigging pin inserted through the coupling apertures of the first and second rigging components, the rigging pin having a first end disposed in the first counterbore and a second end disposed in the second counterbore, wherein the second end of the rigging pin includes at least one multi-directional locking groove; and
  a lock selectively coupled to the second end of the rigging pin, the lock including:
    a housing configured to extend entirely around the second end of the rigging pin;
    a moveable end at least partially disposed within the housing and configured to extend entirely around the rigging pin;
    a key disposed within the housing and configured to extend entirely around the rigging pin, wherein the key is further configured to engage the multi-directional locking groove of the rigging pin; and
    a spring member disposed within the housing and compressed between the key and the moveable end.

11. The pinned connection assembly of claim 10, wherein the multi-directional locking groove comprises:
  a guide portion extending axially from the second end of the rigging pin;
  a transition portion extending circumferentially from the guide portion; and
  a locking portion extending axially toward the second end of the rigging pin from the transition portion.

12. The pinned connection assembly of claim 11, wherein the transition portion has a first width coinciding with the guide portion and a second width coinciding with the locking portion, the second width being wider than the first width.

13. The pinned connection assembly of claim 12, wherein the transition portion includes a slanted side wall disposed at an angle of about 75 degrees to about 85 degrees from a longitudinal axis of the locking pin.

14. The pinned connection assembly of claim 11, wherein a length of the locking portion is about 75 percent of a length of the guide portion.

15. The pinned connection assembly of claim 10, wherein:
  the first end of the rigging pin comprises a flange end with a flange; and
  the first counterbore defined by the coupling aperture of the first rigging component is shaped to receive the flange of the rigging pin.

16. A method of assembling a pinned connection assembly comprising first and second rigging components each having coupling apertures, the first rigging component having a retention aperture transverse to the coupling aperture, the retention aperture extending through an entirety of the first rigging component from a first counterbore of the retention aperture to a second counterbore of the retention aperture, a rigging pin having a retention groove, a locking pin having a first end and a second end, the second end of the locking pin including a multi-directional locking groove, and a lock having a housing configured to extend entirely around the second end of the locking pin, a moveable end at least partially disposed within the housing and configured to extend entirely around the locking pin, a key at least partially disposed within the housing and configured to extend entirely around the locking pin, wherein the key is further configured to engage the multi-directional locking groove of the locking pin, and a spring member disposed within the housing and compressed between the key and the moveable end, the method comprising:

- inserting the rigging pin through the coupling apertures of the first and second rigging components;
- inserting the locking pin through the retention aperture of the first rigging component and the retention groove of the rigging pin, with the first end of the locking pin disposed in the first counterbore of the retention aperture and the second end of the locking pin disposed in the second counterbore of the retention aperture;
- placing the lock on the second end of the locking pin so that the key is received in the multi-directional locking groove;
- compressing the lock against the second end of the locking pin to compress the spring member of the lock and move the key within the multi-directional locking groove;
- rotating the lock to move the key within the multi-directional locking groove; and
- releasing the lock to lock the key within the multi-directional locking groove, with the housing of the lock nested entirely within the second counterbore of the retention aperture.

17. The method of claim 16, wherein the multi-directional locking groove comprises:
- a guide portion extending axially from the second end of the locking pin;
- a transition portion extending circumferentially from the guide portion; and
- a locking portion extending axially toward the second end of the locking pin from the transition portion.

18. The method of claim 17, wherein the transition portion has a first width coinciding with the guide portion and a second width coinciding with the locking portion, the second width being wider than the first width.

19. The method of claim 17, wherein:
- the step of compressing moves the key through the guide portion of the multi-directional locking groove;
- the step of rotating moves the key through the transition portion of the multi-directional locking groove; and
- the step of releasing allows the spring member to expand, thereby moving the key into the locking portion of the multi-directional locking groove.

* * * * *